PHOTO-ELECTRONIC TRIGGERING DEVICE

Filed Oct. 15, 1956 14 Sheets-Sheet 1

INVENTORS
HOWARD J. ECKWEILER, JR.
PAUL D. HANSELL
BY JAMES B. O'MALEY
JOHN W. BARNES
HORATIO DICKERSON
Ostrolenk, Faber, Gerb & Soffen
ATTORNEYS

PHOTO-ELECTRONIC TRIGGERING DEVICE

Filed Oct. 15, 1956 14 Sheets-Sheet 2

INVENTORS
HOWARD J. ECKWEILER, JR.
PAUL D. HANSELL
JAMES B. O'MALEY
JOHN W. BARNES
HORATIO DICKERSON
BY
Ostrolenk, Faber, Gerb & Soffen
ATTORNEYS a - DECK LOCATION, AFT SHEET OF LIGHT
b - DECK LOCATION, FORE SHEET OF LIGHT
c - PLANE OF BARRIER "POP-UP" CABLE INVENTORS
HOWARD J ECKWEILER, JR.
PAUL D. HANSELL
JAMES B. O'MALEY
JOHN W. BARNES
HORATIO DICKERSON
BY
Ostrolenk, Faber, Gerb & Soffen ATTORNEYS

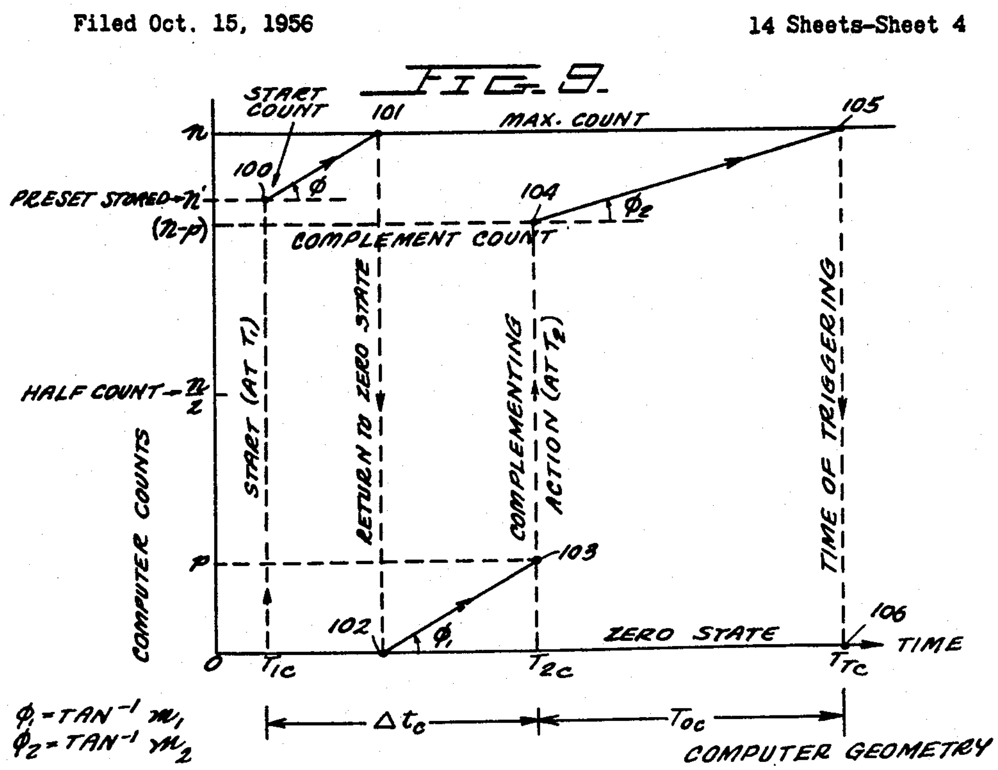

FIG. 9

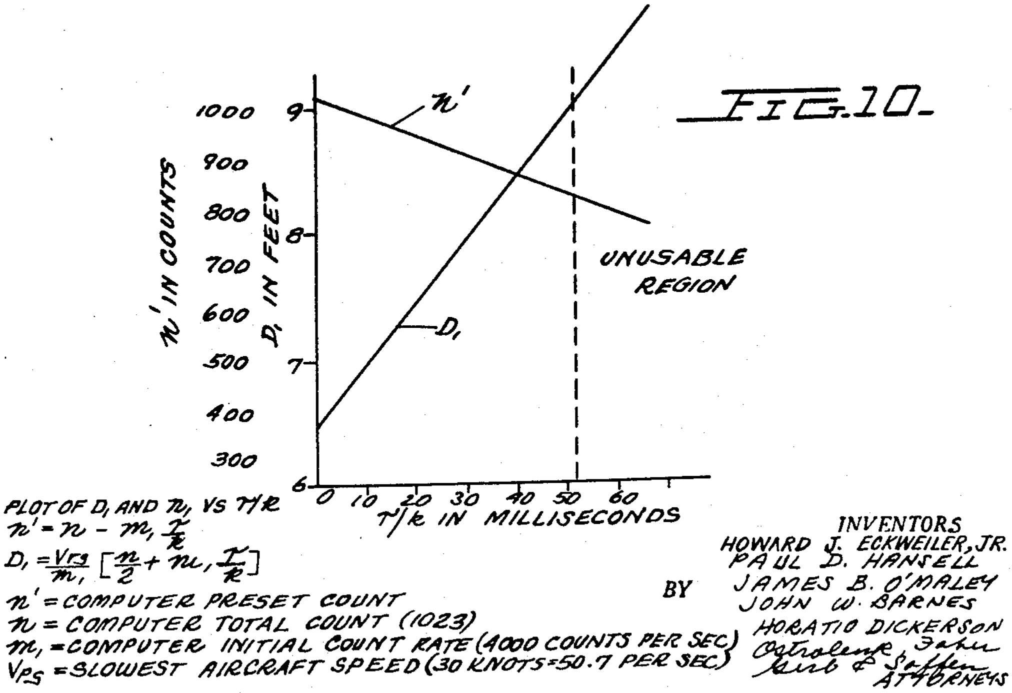

FIG. 10

PLOT OF $D_1$ AND $n_1$ VS T/k $n' = n - m_1 \frac{T}{k}$ $D_1 = \frac{V_{PS}}{m_1}\left[\frac{n}{2} + n_1 \frac{T}{k}\right]$ $n'$ = COMPUTER PRESET COUNT $n$ = COMPUTER TOTAL COUNT (1023)

$m_1$ = COMPUTER INITIAL COUNT RATE (4000 COUNTS PER SEC)

$V_{PS}$ = SLOWEST AIRCRAFT SPEED (30 KNOTS = 50.7 PER SEC)

INVENTORS
HOWARD J. ECKWEILER, JR.
PAUL D. HANSELL
JAMES B. O'MALEY
JOHN W. BARNES
HORATIO DICKERSON
BY Ostrolenk, Faber, Gerb & Soffen
ATTORNEYS INVENTORS
HOWARD J. ECKWEILER, JR.
PAUL D. HANSELL
JAMES B. O'MALEY
JOHN W. BARNES
HORATIO DICKERSON
BY
Ostrolenk, Faber, Gerb & Soffen
ATTORNEYS INVENTORS
HOWARD J. ECKWEILER, JR.
PAUL D. HANSELL
JAMES B. O'MALEY
JOHN W. BARNES
HORATIO DICKERSON
BY
Ostrolenk, Faber, Gerb & Soffen
ATTORNEYS INVENTORS
HOWARD J. ECKWEILER, JR.
PAUL D. HANSELL
BY JAMES B. O'MALEY
JOHN W. BARNES
HORATIO DICKERSON
Astrolenk, Faber, Gerb & Soffen ATTORNEYS INVENTORS
HOWARD J. ECKWEILER, JR.
PAUL D. HANSELL
BY JAMES B. O'MALEY
JOHN W. BARNES
HORATIO DICKERSON
Ostrolenk, Faber, Gerb & Soffen
ATTORNEYS INVENTORS
HOWARD J. ECKWEILER, JR.
PAUL D. HANSELL
JAMES B. O'MALEY
JOHN W. BARNES
HORATIO DICKERSON
BY Ostrolenk, Faber, Gerb & Soffen
ATTORNEYS INVENTORS
HOWARD J. ECKWEILER, JR.
PAUL D. HANSELL
JAMES B. O'MALEY
JOHN W. BARNES
HORATIO DICKERSON
BY Ostrolenk, Faber, Gerb & Soffen
ATTORNEYS

PHOTO-ELECTRONIC TRIGGERING DEVICE

Filed Oct. 15, 1956

INVENTORS
HOWARD J. ECKWEILER, JR.
PAUL D. HANSELL
BY JAMES B. O'MALEY
JOHN W. BARNES
HORATIO DICKERSON
Ostrolenk, Faber, Gerb & Soffen
ATTORNEYS

PHOTO-ELECTRONIC TRIGGERING DEVICE

Filed Oct. 15, 1956 14 Sheets-Sheet 12

INVENTORS
HOWARD J. ECKWEILER, JR.
PAUL D. HANSELL
BY JAMES B. O'MALEY
JOHN W. BARNES
HORATIO DICKERSON
Ostrolenk, Faber, Gerb & Soffen
ATTORNEYS INVENTORS
HOWARD J. ECKWEILER, JR.
PAUL D. HANSELL
JAMES B. O'MALEY
JOHN W. BARNES
HORATIO DICKERSON
BY
Ostrolenk, Faber, Gerb & Soffen
ATTORNEYS

PHOTO-ELECTRONIC TRIGGERING DEVICE

Filed Oct. 15, 1956 14 Sheets-Sheet 14

INVENTORS
HOWARD J. ECKWEILER, JR.
PAUL D. HANSELL
JAMES B. O'MALEY
JOHN W. BARNES
HORATIO DICKERSON
BY Ostrolenk, Faber, Gerb & Soffen
ATTORNEYS 2,955,209

PHOTO-ELECTRONIC TRIGGERING DEVICE

Howard J. Eckweiler, Jr., Manhasset, Paul D. Hansell, Jamaica, James B. O'Maley, Seaford Harbor, John W. Barnes, Floral Park, and Horatio W. Dickerson, Huntington, N.Y., assignors to Kollsman Instrument Corporation, Elmhurst, N.Y., a corporation of New York Filed Oct. 15, 1956, Ser. No. 615,825

4 Claims. (Cl. 250—221)

This invention relates to novel photo-electronic systems and more particularly to a photo-electronic system for automatically and accurately timing the triggering of a "pop-up" barrier cable on a carrier deck for aircraft landing. The invention has broader application than the particular aircraft embodiment, as will be set forth.

A barrier cable is generally arranged on the deck of an aircraft carrier and used for landing aircraft not stopped by the normal arresting means otherwise used. The barrier cable rises in a vertical plane to strike the landing aircraft near its catchment point which in general is the junction of the main landing gear with the fuselage. The invention system integrates the time of passage of the aircraft over the deck and automatically establishes therefrom the proper instant to trigger the release solenoid of the barrier cable mechanism. An optimum cable triggering time is provided by the invention system, whereby earliest firing occurs consistent with the cable clearing all of the aircraft's obstructions ahead of its catchment point.

A specific point of release is denoted for each aircraft, which point is directly above the cable at the instant it leaves the deck. The point of release is usually the last point at which the barrier cable can rise without engaging any obstructions of the aircraft such as its propeller, nosewheel, wing tanks, etc. In accordance with the present invention, a retroreflector unit is mounted on each aircraft at a specific distance with respect to the aforesaid point of release. Such distance between the retroreflector and the cable release point is the same for all aircraft for a given geometric arrangement of the carrier borne equipment.

In an invention embodiment, two sheets of infra-red light are modulated and projected across the carrier deck. As the aircraft passes through the infra-red light sheets, retroreflection of the light beams occurs, returning light to the respective sources. The reflected light signals are duly received by the invention system which is arranged to uniquely sense these reflections as against spurious light pulses that otherwise may impinge upon the light receivers. Automatic computation is thereupon provided for the appropriate barrier triggering time delay, established by measuring the interval between the two reflected light signals. The invention system is fully automatic in scope and largely independent of the aircraft's trajectory or retroreflector height above the deck.

The large variety of aircraft types used aboard carriers are for the purposes of the present invention resolved according to aircraft power plant and aircraft landing gear configuration. The optimum cable triggering time is that which provides the earliest firing consistent with the barrier cable clearing all the aircraft obstructions and maintain adequate height for engagement of the catchment point. The invention system is arranged to cover an angle of elevation such that the retroreflector position may vary, e.g. up to about 20 feet above the deck. Actual parameters are, of course, different for other applications of the invention.

Another important feature of the invention is its sensing of aircraft speed and that the "pop-up" barrier cable is triggered only for aircraft having relative landing speeds between a set minimum and maximum. For example, if a landing speed minimum is chosen at 30 knots, the aircraft is assumed to be taxiing and under control below the 30 knot speed. If the maximum system actuation speed is selected for an aircraft at, say, 105 knots, the aircraft is assumed to be regaining flight speed when it is above such system maximum. In either case, the invention system is arranged not to trigger the "pop-up" barrier cable when it detects a passing aircraft below the minimum (30 knot) speed or above the maximum (105 knot) speed.

The invention system will function properly for aircraft touching the deck at various angles of yaw, pitch and roll to as much as within 15 degrees of the horizontal or vertical axis in practice. Also, a further important feature of the invention system is its being selective in its detection to prevent automatic triggering of the barrier cable by inadvertent sensing of false targets, such as reflections from window panes, a direct way of a luminous body, from flying debris, automotive equipment, etc. The retroreflector mounted on the aircraft is uniquely detected only when it passes through the two projected sheets of modulated light.

The photo-electronic system of the present invention incorporates novel safety features to prevent inadvertent triggering action. The system is further provided with an automatic clearing feature such that it returns to the ready state rapidly, as within 20 seconds after the firing circuit has been energized. The invention system is rugged and able to withstand inadvertent knocks and bumps from aircraft handling personnel on the flight deck.

While the invention is described with respect to aircraft landing and barrier cable triggering, it is broadly applicable to any vehicle or moving body and for recording or actuation thereby, in general.

It is accordingly an object of the present invention to provide a novel automatic photo-electronic actuation system.

Another object of the present invention is to provide a novel automatic photo-electronic triggering system for the release of a barrier cable to arrest a landing aircraft.

A further object of the present invention is to provide a novel speed responsive actuation system operable only between a predetermined minimum and maximum vehicle speed.

Still another object of the present invention is to provide an automatic speed responsive triggering system which is substantially independent of the vehicle trajectory.

Still a further object of the present invention is to provide a novel photo-electronic actuation system incorporating a retroreflector which uniquely determines the time at which the retroreflector passes the system detectors.

A further object of the present invention is to provide a novel barrier cable triggering system operable over widely varying angles of yaw, pitch and roll of the aircraft with respect to the horizontal or vertical axis.

Still a further object of the present invention is to provide a novel photo-electronic triggering device which is selective in its detection to prevent automatic triggering by inadvertent sensing of false targets.

Still another object of the present invention is to provide a novel speed responsive photo-electronic triggering system incorporating an electronic computer which precisely integrates the time interval of passage of a moving retroreflector and accurately determines the time for triggering only between a predetermined minimum and maximum speed of operation.

These and further objects of the present invention will become more apparent in the following description of an exemplary embodiment thereof taken in connection with the drawings in which:

Figure 9 is a geometric diagram of the digital computer of the invention system.

Figure 10 is a plot of parameters used in the computer system determinations.

Figure 1:
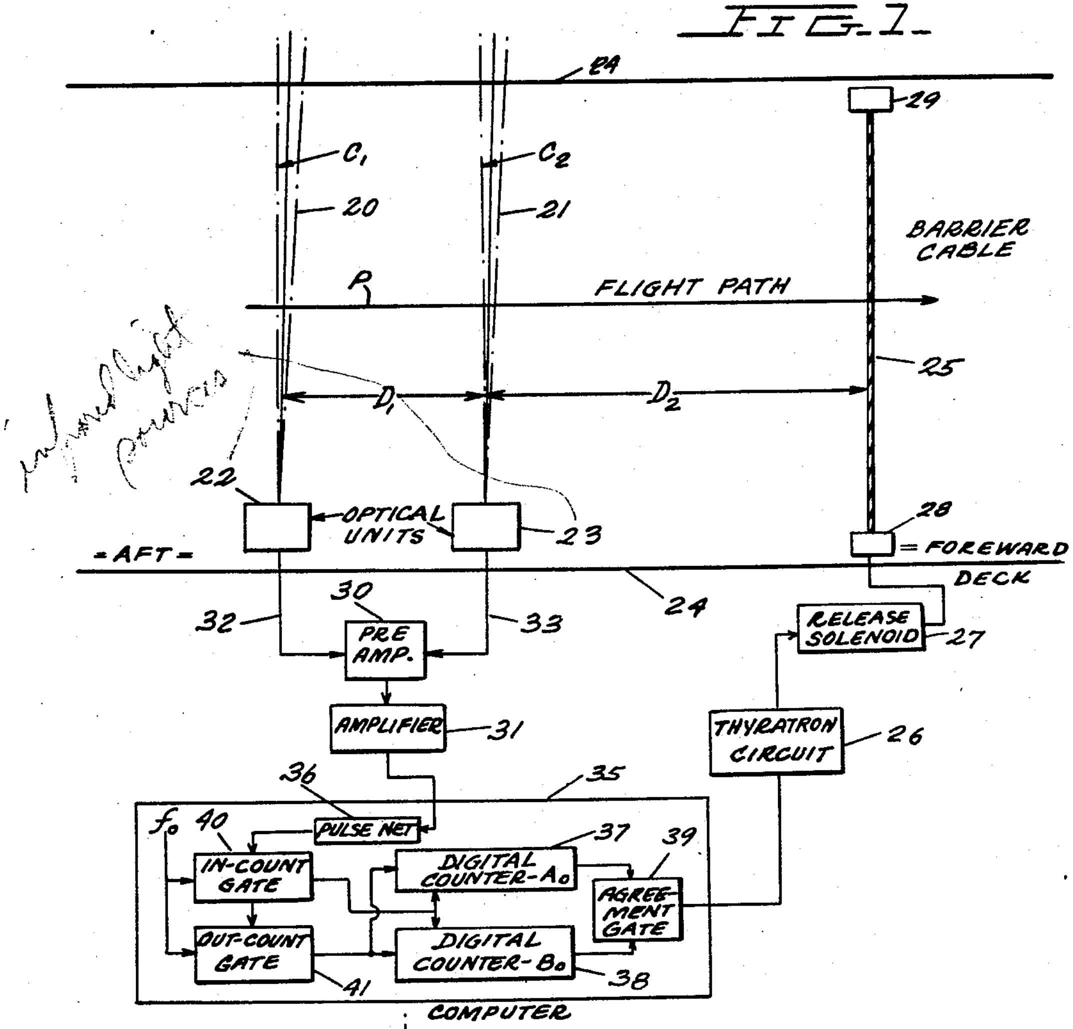
Figure 1 is a schematic diagram of the exemplary photo-electronic barrier cable triggering system.

In accordance with the present invention, referring to Figure 1, two sheets of infra-red light 20, 21 are projected from two separate optical units, namely the aft unit 22 and fore unit 23 mounted on one side of carrier deck 24. The barrier cable 25 is arranged transverse along the forward deck as indicated in Figure 1. Barrier cable 25 is a triggered "pop-up" device which when electrically actuated rises rapidly in a vertical plane to strike the aircraft A near its catchment point which in general is the junction of the main landing gear with the fuselage. As indicated in Figure 1, aircraft A lands upon deck 24 along flight path P, traversing firstly the aft infra-red beam 20 and then the fore infra-red beam 21, and moving along flight path P until it traverses the position of barrier cable 25.

With the circuital system of the invention, to be set forth and described in more detail, a thyratron circuit 26 is activated to energize release solenoid 27, which in turn controls the actuation of the barrier release cable mechanism 28, 29 associated with barrier cable 25. The deck optical units 22 and 23 contain photo-electric receptors or receiving units which are responsive to the infra-red light beams 20 and 21, respectively, as reflected from a retroreflector cluster (not shown) mounted on the fuselage of the aircraft A as it traverses the respective beam 20, 21. The infra-red beams 20, 21 modulated at a predetermined frequency are returned by retroreflection and received by optical unit receivers 22, 23. Since the respective signals are sequentially generated in time, they are introduced to common preamplifier unit 30 which amplifies the received electronic signals created by the aircraft's interception of beams 20 and 21. In an alternative arrangement, one deck unit 22 is used with one sheet of light with, however, two horizontally spaced retroreflector clusters mounted on the vehicle to successively intercept the light sheet and create the time spaced signals.

The electric cables 32, 33 from respective optical units 22, 23 are included in the cable connectors between the deck mounted optical units and the below-deck location of the computer system. The transmitting optics of each of the units 22, 23 includes a projection lamp whose filament is imaged on the surface of a rotating light chopper or raster as will be shown and described in more detail hereinafter. The raster consists of alternate transparent and reflecting sectors which serve to produce two oppositely phased pulsed light beams. Separate objective lenses project these beams athwart the flight deck in such manner that they superimpose to form a single sheet of light having a wide vertical and a narrow horizontal spread.

The aircraft A mounts a cluster of retroreflectors whose singular property of reversing the direction of a generally incident light beam permits a unique sensing of the passage of that cluster through the sheet of light. This sensing is effected by juxtaposing a photo-sensitive receiver with one of the two objectives projecting the superimposed beams, as will be described in more detail. Except for improbable and artificial cases, only retroreflected light, i.e. from the cluster, gives rise to a pulse train type signal in the receiver. Two time separated pulse trains are produced by retroreflection when the aircraft A respectively traverses the incident infra-red light sheets 20, 21 in turn.

The leading edges, lines $C_1$ and $C_2$, of the beams 20, 21 are spaced by a predetermined distance $D_1$. Thus, the time separation at the beginning of each pulse train is dependent upon the speed of the aircraft A and the inclination of its flight path P with respect to the sheets of light 20, 21. The triggering of the barrier cable is dependent upon the incidence of the airplane's catchment point with the plane of barrier cable 25. Only the component of the flight path P perpendicular to the light sheets 20, 21 and cable 25 is pertinent to the trigger timing solution.

The interval of interception of the retroreflective cluster of airplane A by the respective beams 20, 21 are recorded by the optical units 22, 23, producing a measure of the normal or perpendicular velocity or speed component of the aircraft A across the flight deck. This is an important factor in the point of triggering solution. Also, the distance $D_1$ is made small in comparison with the speeds of the aircraft so as to result in utilization of a substantially constant speed as their intervals across $D_1$ in computation, as will be set forth hereinafter. The output of preamplifier 30 is impressed upon amplifier 31 which transmits the respectively received pulsed signals due to the retroreflection by the aircraft passage of beams 20, 21.

The computer 35 is indicated schematically in Figure 1 and is outlined in more detail in block diagram Figure 11 and described more fully hereinafter in connection therewith. Computer 35 contains a pulse-forming network indicated at "pulse-net" unit 36 and two digital counters ($A_0$, $B_0$) 37, 38. The retroreflector in passing through the sheets of light 20, 21 modulated at a unique frequency (e.g. 8,000 cycles) reflects a burst or pulse train of modulated light back to the photo-sensitive receivers in the deck units 22, 23. By virtue of the fact that the pulse train consists of a series of light pulses occurring at a unique frequency, the pulse forming network 36 individuates these signals from spurious bursts such as might result from reflected sunlight.

The pulse generated by pulse forming network 36 when the retroreflector passes through the aft sheet of light 20 gates the output of a constant frequency oscillator $f_0$ into dual counter 37, 38 which starts to count from a preset number.

There are two possible modes of operation arranged in computer 35 after the counting is initiated. In accordance with the invention, if the aircraft is travelling at less than a predetermined minimum speed, e.g. 30 knots, or more than a second predetermined speed, e.g. 105 knots, the dual counter 37, 38 counts to its half capacity, resets, and the barrier 25 is not triggered. On the other hand, if the aircraft speed lies between the predetermined minimum and maximum speed for the system, namely 30 and 105 knots in the present example, the retroreflector in passing through the fore sheet of light 21 generates a second pulse which instantaneously reverts the counter 37, 38 to its complement count.

The counter continues to count either at the same rate or at a new rate as desired until the full capacity has been reached and the counter returns to the zero state. The return of the counter to the zero state is sensed, at which time the thyratron barrier release solenoid firing circuit 26 is triggered. The rate of count after the counter has reverted to its complement count (and hence the slope $C_2$ in Figure 9) may be varied either in integral multiples or submultiples of the first count rate or, if a separate timing unit is employed, may be varied at any desired rate. Counters 37, 38 are then arranged to automatically reset, as will be set forth in full detail hereinafter in connection with Figure 11.

An important feature of the present invention resides in the accurate and precise timing of the triggering of the barrier release solenoid 27 to vertically pop-up the barrier cable 25 in a manner to avoid engagement with the aircraft by impedances such as propellers, nosewheels, etc. and meet the catchment point as desired, to arrest the aircraft A travelling along flight path P. Also, it is important to note that the invention system provides for the barrier cable not to release when the aircraft A speed is below a preset minimum such as 30 knots or above a preset maximum speed such as 105 knots. This is very important in the operational use of the invention system for safety.

As aforesaid, when the aircraft speed is below 30 knots, it is presumed that it is taxiing and does not need the barrier cable release. On the other hand, when the aircraft A is travelling above the herein stated maximum of 105 knots, the barrier cable also is not released on the presumption that the aircraft is passing across the deck for a retry. The barrier cable 25 is set at a predetermined distance $D_2$ from the fore optical deck unit 23 as indicated in Figure 1. For a given computer 35 with preset parameters, the distances $D_1$ and $D_2$ are significant in determining the computer parameters as is described hereinafter and must be maintained rigorously for accurate operation of the system, as will be understood by those skilled in the art.

The utilization of two digital counters $A_0$ and $B_0$ (37, 38) in computer 35 is important for providing absolute safety of the system operation. If only one counter were used, it is possible through malfunction thereof to derive an extraneous pulse that could inadvertently trigger the barrier cable 25. The dual counters 37, 38 are incorporated to prevent such possibility. If the timing solutions afforded by both counters 37, 38 are not in coincidence, the barrier trigger is prevented by a gating circuit 39 which is termed "agreement gate."

The pulse forming network 36 is responsive to the light pulses of unique frequency as received by optical units 22 and 23 due to retroreflected light beams 20 and 21, respectively, by passage of aircraft A across the predetermined distance $D_1$. The pulse forming network 36 accordingly generates a pulse when the retroreflector passes through the aft beam 20 to gate the local constant frequency signal $f_0$ through in-count gate 40 and out-count gate 41 to the digital counters 37 and 38. The dual counter 37, 38 starts to count from a preset number. When the aircraft speed is between the predetermined minimum and maximum (30 to 105 knots), the passage of the retroreflector through the fore sheet of light 21 generates a second pulse which directly reverts the counters 37, 38 to their complement count, as stated.

The gated dual counter system hereof, by suitable presetting to be described in detail hereinafter, energizes thyratron control 26 at a precise instant correlated with the released solenoid 27 time lag and barrier cable 25 time lag of operation to cause the barrier cable to engage the aircraft A catchment point as it passes over the plane of the barrier cable. The velocity of the aircraft A between the minimum velocity $V_1$ and maximum velocity $V_2$ (30 to 105 knots herein) across the distance $D_1$ determines the timing of the triggering instant through the computer 35 actuating the thyratron circuit 26. Should the velocity V of the aircraft A be below the minimum speed $V_1$ or above the maximum speed $V_2$, the computer 35 is arranged to not trigger the thyratron 26 circuit and, therefore, the barrier cable 25 does not intercept the aircraft A as it passes thereacross.

Should the sunlight be facing the photo-electric receptors of optical units 22, 23, they are instead mounted on the opposite side of carrier deck 24 so that the leading edges of the beams $C_1$ and $C_2$, respectively, are perpendicular to the center line and thus maintain the distances $D_1$ and $D_2$ which in turn determine the preset constants of computer 35. Thus, the receptor units of the optical systems 22, 23 are faced opposite the direct sunlight, with the remaining aspects and function of the invention system remaining the same. A retroreflective cluster is mounted on each side of the fuselage of aircraft A in order that each aircraft may be operated upon by the barrier cable arrestor system with the deck units 22, 23 on either side of deck 24.

Figure 2:
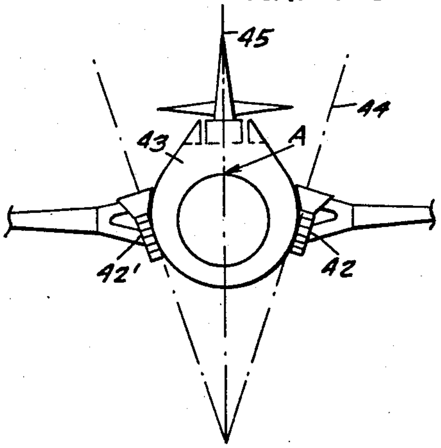
Figure 2 is a front view illustration of an airplane with a retroreflector cluster mounted on each side.

Figure 2 is a front view of the aircraft A illustrating the mounting of two retroreflector unit clusters 42, 42'. The angle of mounting of retroreflector cluster 42 on fuselage 43 is along plane 44, being at $\alpha°$ to the vertical 45. In a practical embodiment, angle $\alpha$ has been found to be satisfactory at 19°. It is to be understood that the corresponding retroreflector cluster 42' to that of 42 is mounted on the opposite side of the fuselage 43 at the same $\alpha°$ angle. The location of retroreflector units 42, 42' is such that for all practical maneuvering and approaches of aircraft A along flight deck 24 through infrared light sheets 20, 21, one of the two clusters 42, 42' will intercept the light sheets 20, 21 and return or retroreflect them back to their respective photo-electric receptors within optical units 22 and 23. Should the invention be applied to vehicles or moving bodies other than aircraft, suitable location of the retroreflector units thereon is made, giving effect to the aforesaid principles and features, as will now be understood by those skilled in the art.

Figure 3:
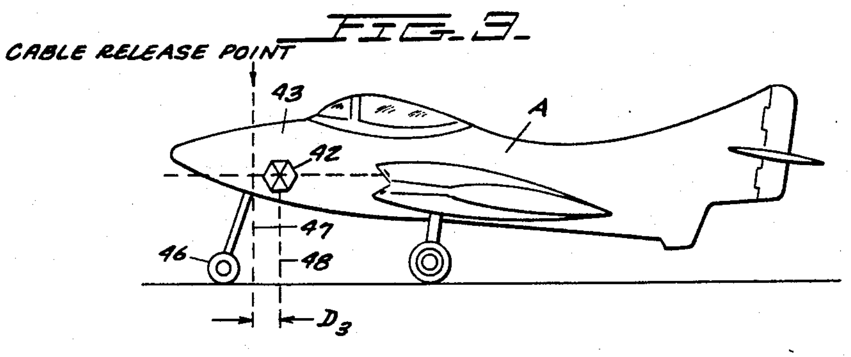
Figure 3 is a side elevational view of an aircraft illustrating a preferred retroreflector mounting location.

Figure 3 is a side elevational view of an aircraft A showing the retroreflector cluster 42 mounted on the side of fuselage 43. Airplane A has a nosewheel 46 which must blear the plane of the barrier cable before the triggering thereof. The vertical line 47 of Figure 3 represents the foremost position of the aircraft below which the cable rise may safely begin in the course of aircraft A along the deck 24. The vertical line 48 intersects the center of retroreflector cluster 42 mounted on the aircraft fuselage 43. The distance $D_3$ represents that between the retroreflector center and the foremost point on the aircraft below which the cable may rise.

The retroreflector cluster is thus mounted at a point whose fore-aft distance $D_3$ with respect to the catchment point has a particular value for each type of aircraft, as will be explained in full detail hereinafter. The time of passage of the aircraft between the aft and the forward deck units 20, 21 is an inverse function of the aircraft velocity and is directly obtained as the interval between the two retroreflected light pulse trains referred to. Such interval is utilized by the computer 35 to predict the instant at which the aircraft A will cross the barrier cable 25. The actual signal for triggering the cable 25 is advanced with respect to the computed instant of crossing by a constant time which allows for the delay between the triggering signal and the actual rise of the cable 25 from the deck well.

Line 47 represents the cable release point on each aircraft, which is usually the last point at which the cable can start its rise without engaging any obstructions on the aircraft, such as propeller, nosewheel, wing tank, etc. The distance $D_3$ between the retroreflector position 48 and the cable release position 47 is made exactly the same for all aircraft assigned to a given computer-trigger system as the constants, settings and timing actions of the computer are all correlated with respect to the distance $D_3$, as well as distances $D_1$ and $D_2$, as will be explained in detail hereinafter.

Figure 4:
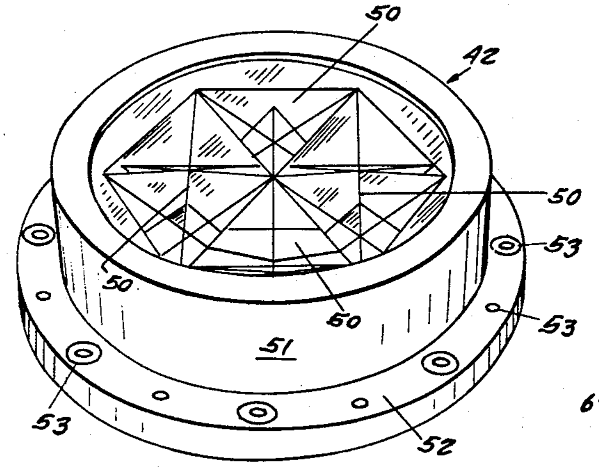
Figure 4 is a perspective illustration of the retroreflector cluster.

Figure 4 is a perspective illustration of a retroreflector cluster 42 embodiment for mounting on the fuselage of an aircraft. The retroreflector cluster 42 comprises a group of six individual retroreflector units 50, 50. The retroreflector units 50, 50 are suitably set within flanged metallic housing 51 having base flange 52 with openings 53, 53 for securement to the aircraft body. Each retroreflector unit 50 has the form of a tetrahedron, three of whose sides are mutually perpendicular, and the fourth side of which is an equilateral triangle. Details of a retroreflector unit 50 per se are not set forth herein, as such is well known in the art.

The effective diameter of a retroreflector 50 is approximately a circle inscribed in the aforesaid equilateral triangle. A ray of light incident to the equilateral surface is successively reflected from the other three surfaces and has the property of emerging diametrically opposite from the point at which it entered and parallel to the incident ray. By virtue of this property, if a point source is used, the retroreflected beam diameter measured at the source will be approximately twice the effective diameter of the retroreflector. In the case of an extended light source, the retroreflected beam diameter measured at the source will be approximately twice the effective diameter of the retroreflector plus the diameter of the source. The function of the retroreflector cluster 42 is to provide a multiplicity of retroreflector units to ensure a satisfactory and sufficiently intense reflected modulated signal to the photoelectric sensors in optical units 20, 21 for the control purposes of the system.

Figure 5:
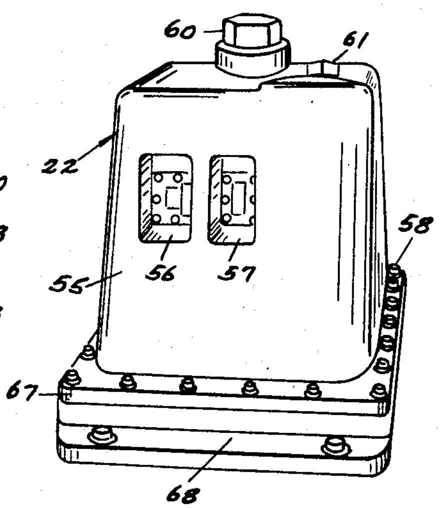
Figure 5 is a front view of the optical unit for the carrier deck.

Figure 5 is a perspective illustration of an exemplary optical deck unit 22 which is identical to the companion unit 23 (Figure 1). The internal optics of deck unit 22 is housed within a substantial frame 55 having two frontal openings 56, 57 for the dual modulated light beam array and for photoelectric perception thereof, as detailed in Figure 7. The housing 55 has a flange 58 extending from its base. Access nut 60 on top of housing 55 is for insertion of a silica gel capsule. Access nut 61 is for the projection lamp in unit 22.

Figure 6:
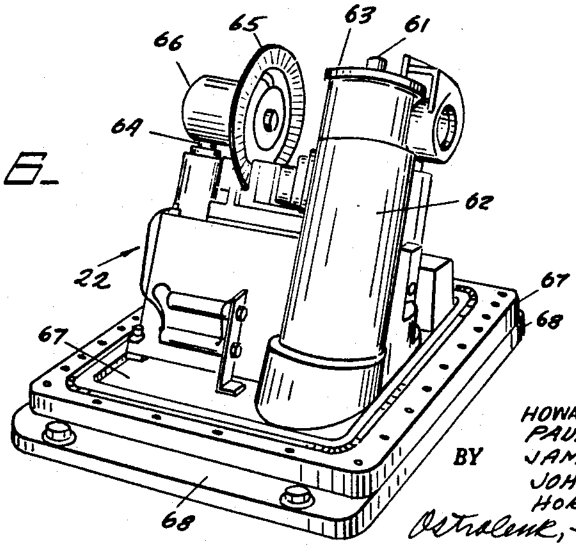
Figure 6 is an internal view of the optical unit of Figure 5 with the cover removed.

Figure 6 is a perspective illustration of the deck unit 22 of Figure 5 with housing 55 removed, showing the interior parts of the exemplary embodiment. A projection lamp is fitted within cylindrical housing 62. Access to the projection lamp (not shown) is provided by cap 63 on cylindrical housing 62. The photo-sensitive cell is accessible through cap 64. The rotatable raster disc 65 is driven by synchronous motor 66 secured to the basic interior of deck unit 22. The unit 22 of Figures 5 and 6 is rigidly assembled onto base plate 67 which is bolted to flange 58 of housing 55. Extending flange 68 of base 67 is bolted to a mounting panel aboard the carrier deck 24 arranged for shifting angularly to align the emitted beams 20 and 21 in exact parallel alignment as indicated in Figure 1.

Figure 7:
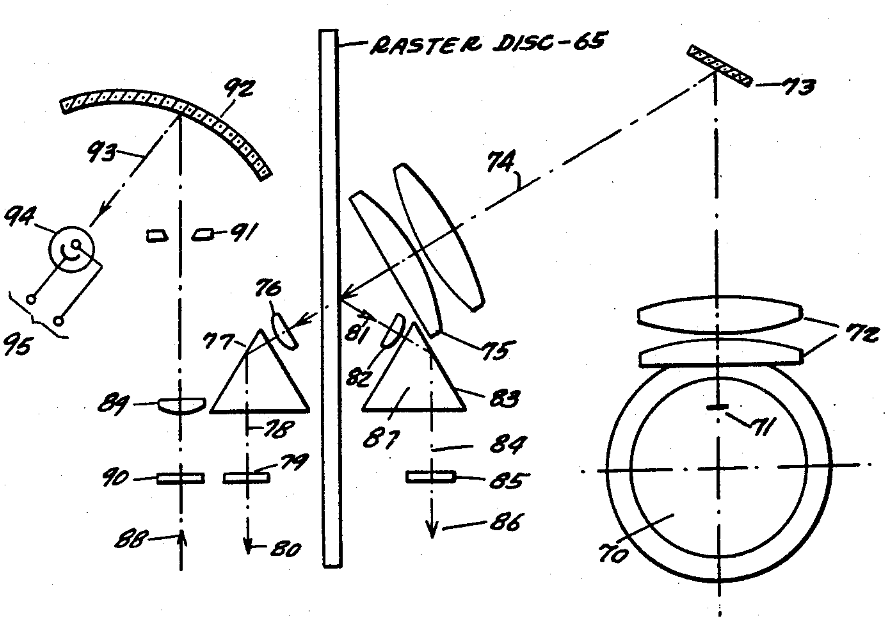
Figure 7 is a diagrammatic representation of the optical system of the unit of Figures 5 and 6.

Figure 7 is a schematic optical drawing of the deck units 22 and 23. A projection lamp 70 is utilized with a ribbon filament 71 as the light source. The light from filament 71 passes through a collimating lens system 72 to mirror 73. The reflected light beam 74 from mirror 73 passes through lens system 75 which images the projection lamp filament 71 at the surface of the light chopper or raster disc 65. The rotating raster disc 65 (see Figure 6) consists of alternate transparent and reflecting sectors driven by a synchronous motor 66 to modulate the light beam 74 at a desired frequency, e.g. 8,000 cycles per second in the exemplary embodiment.

The beam 74 passes through the transparent portions of raster disc 65, on through the objective lens 76 which forms the desired vertically projected 45° beam of light passing through prism 77. The light-pulsed beam 78 emerging from prism 77 is passed through an infra-red filter 79 for security purposes as aforesaid and emerges as the pulsed light beam 80 of very narrow azimuth spread (e.g. 3°) at the desired 45° vertical spread.

The light beam 81 represents the alternate reflected pulses of light from raster disc 65 resulting from the basic incident light beam 74. Interrupted beam 81 is oppositely phased and modulated with respect to the basic raster-transmitted beam 78. The 180° opposite beam 81 is passed through objective lens 82 and adjustable prism 83 and emerges as a pulsed beam 84 (at the exemplary 8,000 cycle frequency), on through infra-red filter 85 as an emergent companion beam 86 to beam 80. The prism 83 is angularly adjustable along its axis 87 to permit superimposition of the two projected beam arrays 80 and 86 to form the single composite beam of light constituting the sheet of light 20 (Figure 1). These beam arrays 80, 86 emerge from the corresponding windows 56, 57 of the deck unit housing 22 (Figure 5) before being combined to form beam 20.

The receiving optical system may be mounted close to either one of the transmitted light arrays 80 or 86 and is, therefore, removed from the other. Thus, in Figure 7 the received light 88 passes through the receiver objective lens 89 and infra-red filter 90 and is focused through field stop 91. A spherical mirror 92 images the objective lens 89 as a beam 93 onto photocell 94. The output leads 95 of photocell 94 conduct the pulsed received light beam corresponding electrical pulses to an amplifier and the computer circuit 35 described in connection with Figures 1 and 11.

The center of the transmitted beam 80 of Figure 7 is located, in the exemplary embodiment, ½ inch from the optical center of the receiving beam 88 system. The center of the other transmitted beam 86 is 2¼ inches from the center of the receiving position 88. The size of the retroreflectors 50, 50 (Figure 4) is so chosen as to return a patch of light approximately 2½ inches in diameter centered at each transmitted beam. By virtue of the location of the two transmitted beams, only retroreflected light from the transmitted beam 80 that is adjacent to the received light 88 will give rise to a modulated signal at terminals 95 of photoelectric cell 94. This is because the distance from the opposite beam 86 to the receiving optical center 88 (2¼ inches) is substantially greater than the radial distance of the retroreflected beam returned to the deck unit 22.

Reflectors other than retroreflectors will in general return light to the receiver from both transmitted beams, resulting in cancellation of the modulation frequency. This is due to the composite arrays 80, 86 being of opposite phase. Thus, passage of the retroreflector through the composite beam of light 20 is uniquely sensed. The combination of a plurality of retroreflector units 50 within cluster 42 increases the intensity of the returned patch of light proportionately to the number of units but does not increase the size or diameter of the light patch returned.

The receiver field stop 91 is located at the focal plane of objective lens 89 and limits the horizontal coverage by the beam to 3° in the exemplary unit. This makes a very narrow beam 20, 21 as it is very important that the time at which the retroreflector 42 passes the leading edges of the beams $C_1$, $C_2$ be uniquely determined. Locating the aft edge of the beam perpendicular to the center line of the carrier deck (or parallel to the barrier cable 25) prevents athwartship position of the aircraft from affecting this timing. In addition, as the retroreflector unit 42 enters a light beam 20, 21 the received signal builds up to maximum in approximately one millisecond. In this time interval, a 105 knot aircraft moves approximately 2 inches along the deck, a negligible shift. The signal appears as a burst or pulse train of 8,000 cycle pulses at the photocell and is fed through an amplifier and cathode follower (Figures 1 and 11) to the cable 32, 33 connecting the deck unit to the remotely located mixer 30 and computer 35.

*Mathematics of computer system*

The computer unit 35 (Figure 1) of the invention performs the important functions aforesaid in detecting the longitudinal deck speed of the aircraft A as it traverses the beams 20, 21 spaced by distance $D_1$. The computer 35 energizes thyratron control circuit 26 for barrier release solenoid 27 actuation at a precise triggering instant dependent upon the aircraft A speed, which triggering instant must occur safely as the aircraft's "point of release" passes the plane of the barrier cable 25; and prevent the triggering of the barrier solenoid 27 for speeds below a predetermined minimum ($V_1$) and above a predetermined maximum ($V_2$).

Figure 8:
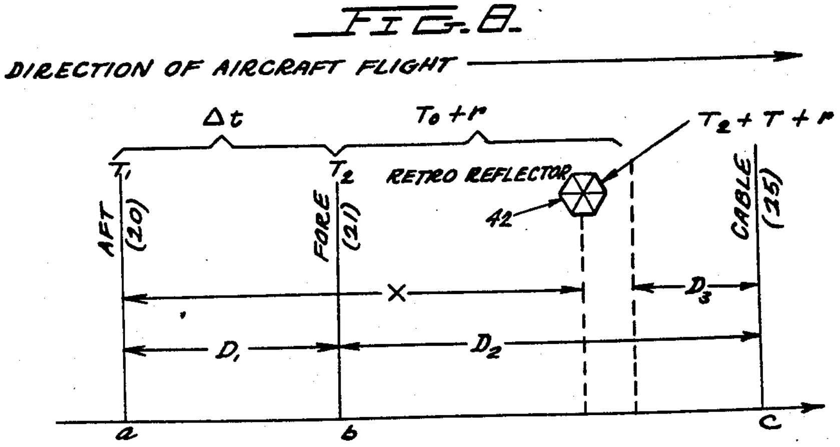
Figure 8 is a diagram of the deck system configuration represented mathematically.
Figure 11:
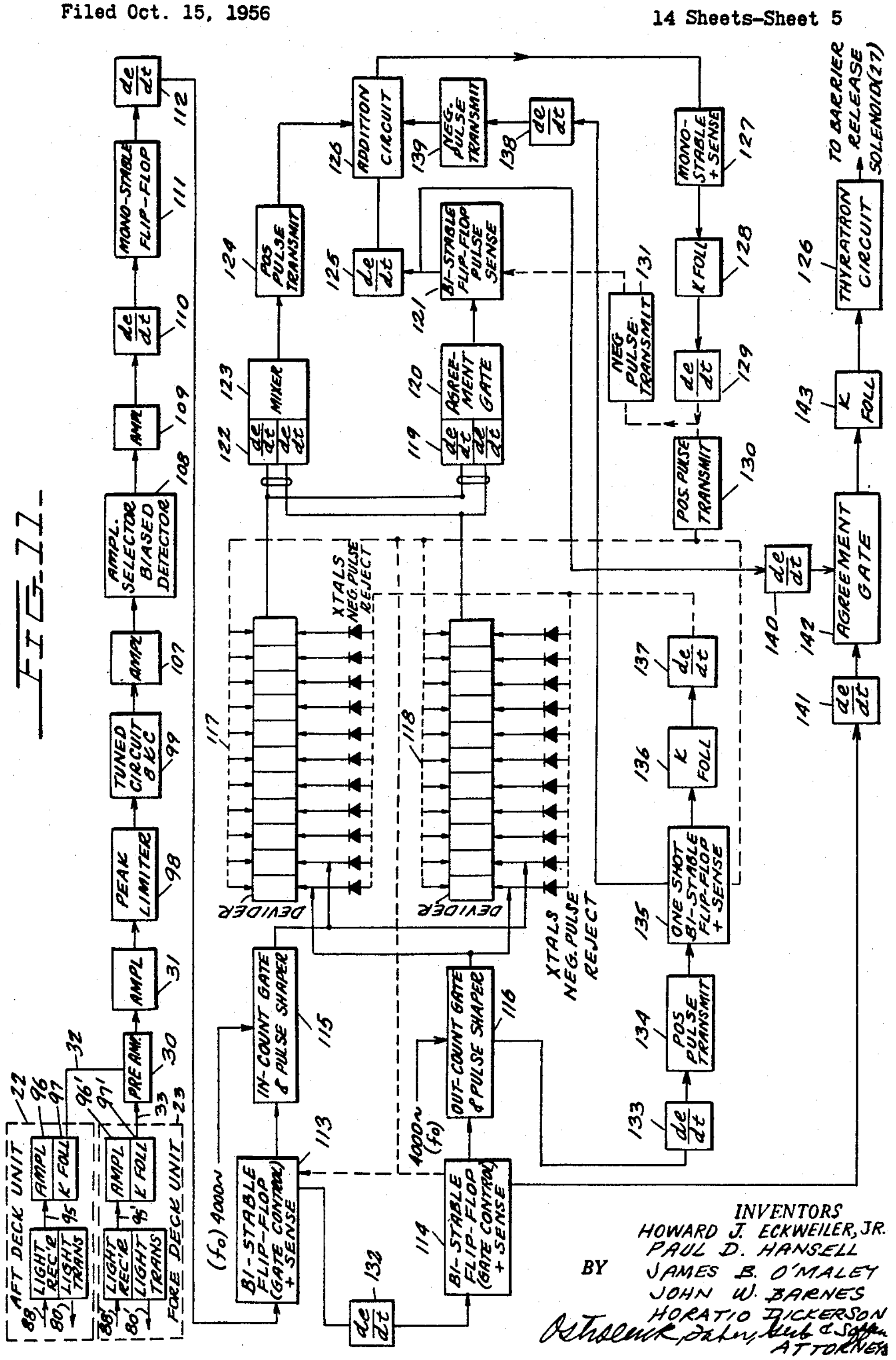
Figure 11 is a block diagram of the exemplary photo-electronic barrier cable triggering system.

Reference is now made to Figure 8 which is a diagrammatic basis of the mathematical background in connection with the computer system schematically shown in Figure 11. As denoted in Figure 8, the distance $D_1$ refers to that between the two sheets of light 20, 21 (see Figure 1) at the respective positions *a* and *b*. Also, the distance $D_2$ denotes that between the fore sheet of light 21 and the plane of the "pop-up" barrier cable 25. As denoted in Figure 3, the distance $D_3$ refers to that between the reteroreflector 42 position 48 on the aircraft and the cable release position 47 thereof. As hereinabove stated, the cable release point is determined by obstruction to be overcome such as nosewheel, propeller, or other structures that must pass over the cable 25 before it can rise to engage the aircraft.

Successful engagement of the cable 25 with the aircraft A depends upon the intersection of the cable with the junction of the main landing gear and the fuselage and accordingly upon the determination of the distance $D_3$ for the aircraft utilized in conjunction with the invention system. The distance $D_3$ has been superimposed upon the deck configuration diagram (Figure 8) so that it lies directly before the cable plane *c*. This indicates that when the retroreflector 42 reaches the distance $D_3$ from cable plane *c*, the earliest proper time is in effect for the cable 25 to start its rise from the deck.

The retroreflector 42 is shown in the diagram in a general position at a distance *x* from the aft sheet of light 20. $T_1$ is the time in which the retroreflector (mounted on the aircraft) passes location *a*, while $T_2$ is the time of its passage at location *b*. The variable *t* represents time in general in the formula hereof. The time delay between the initiation of the cable triggering pulse and the start of cable motion upward is represented by $\gamma$. $T+\gamma$ is the elapsed time after the retroreflector passes location *b*. Then, if $dx/dt$ is the aircraft velocity, and hence the retroreflector velocity, we have:

$$D_1=\int_{T_1}^{T_2}(dx/dt)\,dt \tag{1}$$

$$x=D_1+\int_{T_2}^{T_2+T+\gamma}(dx/dt)\,dt \tag{2}$$

At that particular time when $x=D_1+D_2-D_3$, let $T=T_0$, i.e., the time delay between passage of the retroreflector at station *b* and initiation of cable 25 triggering. $T_0$ is then that time delay which would be selected to ensure earliest possible cable rise consistent with successful engagement. Substituting in Equation 2, $$D_2-D_3=\int_{T_2}^{T_2+T_0+\gamma}(dx/dt)\,dt \tag{3}$$

Since the distances $D_1$ and $D_2$ are relatively small, it is assumed that the average velocity of the aircraft remains unchanged throughout the distance $D_1+D_2$. Thus, $dx/dt=V_p$, a constant. Equation 3 is now readily solved for $T_0$:

$$T_0=\frac{D_2-D_3}{V_p}-\gamma \tag{4}$$

Solving Equation 1 for $V_p$, letting $T_2-T_1=\Delta t$, an alternative form of Equation 4 is obtained:

$$T_0=\left(\frac{D_2-D_3}{D_1}\right)\Delta t-\gamma \tag{4a}$$

A digital computer is used to solve Equation 4*a*. A geometrical outline of the computer operation is shown in Figure 9, where the ordinate is the computer count, while the abscissa is time. The number *n* is the total or maximum count of the computer. The number *n'* is a preset count stored in the computer, from which counting commences at time $T_{1c}$ at 100. $T_{1c}$ is the initial time of start of the computer count. Passage of the retroreflector through the aft sheet of light 20 at time $T_1$ initiates the computer count at the preset stored count *n'*. The count proceeds from *n'* to *n* (101), then to the zero state 102, and finally up to the number *p* (103, which is that count occurring at the time $T_{2c}$. Counting up to this time, i.e. between $T_{1c}$ and $T_{2c}$, occurs at a rate corresponding to the slope $m_1$ along $\phi_1$.

Passage of the retroreflector through the fore sheet of light 21 at time $T_2$ causes the complementing of the binary counter, i.e., the counter assumes the state or setting corresponding to the complement of the number *p* which is the number $(n-p)$ (104). Counting then continues at a rate corresponding to the slope $m_2$ along $\phi_2$ until the *n*th count (105) is again reached, and the counter is thereupon reverted to the zero state 106 at time $T_{TC}$, namely the computer triggering time.

The following relations are evident from the geometry of Figure 9:

$$T_{0c}=T_{TC}-T_{2C} \tag{5}$$

$$T_{TC}-T_{2C}=\frac{p}{m_2} \tag{6}$$

$$p=m_1(T_{2C}-T_{1C})-(n-n') \tag{7}$$

Substituting 6 into 5:

$$T_{0c}=\frac{p}{m_2} \tag{8}$$

Substituting 7 into 8:

$$T_{0c}=\frac{m_1}{m_2}(T_{2C}-T_{1C})-\frac{n-n'}{m_2}=\frac{m_1}{m_2}\Delta t_o-\frac{n-n'}{m_2} \tag{9}$$

It is apparent that Equation 9 has the same form as Equation 4*a*. The ratio of counting rates $$\left(\frac{m_1}{m_2}\right)$$

may be set equal to the constant $$\frac{D_2-D_3}{D_1}$$

which is determined by deck configuration, and $$\frac{n-n'}{m_2}$$

may be equated to $\gamma$.

$$\frac{m_1}{m_2}=\frac{D_2-D_3}{D_1}=k \tag{10}$$

$$\frac{n-n'}{m_2}=\gamma$$

Equations 4*a* and 9 then become:

$$T_0=k(T_2-T_1)-\tau \tag{11}$$

$$T_{0c}=k(T_{2c}-T_{1c})-\tau$$

The computer times, $T_{1C}$ and $T_{2C}$, in general lag the actual times $T_1$ and $T_2$ because of the following two factors:

(*a*) The intersection of the retroreflector with the light beam is not sensed until the retroreflector 42 has penetrated into the beam 20, 21.

(*b*) The frequency source $f_0$ gated into the counter at times $T_1$ and $T_2$ is not in general synchronous with these times; hence, $T_{1C}$ and $T_{2C}$ may lag $T_1$ and $T_2$, respectively, by as much as one counting cycle.

Providing that both beams 20, 21 are regular in contour and properly mounted on the carrier deck 24, these factors (*a*) and (*b*) contribute the only significant system lags. It is interesting to note the error contributed to the triggering time $T_T$ by these lags. By definition:

$$(12) \qquad T_T=T_0+T_2$$
$$T_{TC}=T_{0c}+T_{2C}$$

The difference $(T_T-T_{TC})$ is the error in triggering time, and by substituting Equations 11 into Equations 12, the following relation for the error is obtained:

$$(13) \qquad T_T-T_{TC}=k(T_{1C}-T_1)-(k+1).(T_{2C}-T_2)$$

If the time lag interval $(T_{1C}-T_1)$ is approximately equal to the lag interval $(T_{2C}-T_2)$, and this is in general the case, then from Equation 13 it is apparent that the error in triggering is approximately one lag interval, regardless of the value of $k$. Quantitatively, the lag caused by penetration of the retroreflector of the exemplary embodiment into the beam is approximately the time required to generate 8 cycles at an 8000 cycle scanning rate or $10^3$ seconds. The time lag contributed by one counting cycle at the counting rate of 4000 cycles/second is $0.25\times10^3$ seconds. Thus, the total lag time would ordinarily not exceed $1.25\times10^{-3}$ seconds. For the fastest deck landing aircraft (i.e. at 105 knots or 177.5 feet/second), this is equivalent to 2.22 inches error in location of the rearmost aircraft obstruction relative to the barrier cable at the time the cable begins to rise. However, the sign of this error is such that the obstruction has already passed the cable by the 2.22 inches (in the case of the 105 knot aircraft); hence, no timing correction is necessary.

Referring to Equation 10, dividing $\gamma$ by $k$ and solving for $n'$, we find:

$$(14) \qquad n'=n-m_1(\gamma/k)$$

Following are some additional pertinent relations involving $n$, $m_1$, $\gamma/k$ and $D_1$. First, it is desirable to keep the distance $D_1$ between sheets of light relatively small so that aircraft velocity $V_p$ will remain essentially constant, as previously assumed. However, the exemplary beam of light is 3° wide and at a distance of 100 feet from the deck unit 22, 23 is therefore at least 5 feet wide. If the beams 20, 21 of light were permitted to intersect, retroreflected light would appear at the receivers of both deck units simultaneously, and the pulse desired at the time $T_2$ would not be generated. Allowing some margin of safety, the distance $D_1$ must be at least 6 feet or greater in this case.

Second, the time required for the fastest deck landing aircraft (i.e. at 105 knots) to cover the distance $D_1$ must be greater than the time required to count from the preset count $n'$ up to the total count $n$. This permits return from $n$ (101) of Figure 9 to the zero state 102 between $T_{1C}$ and $T_{2C}$. Hence:

$$(15) \qquad \frac{D_1}{V_{PF}}>\frac{n-n'}{m_1} \text{ or } \frac{\gamma}{k}$$

$V_{PF}$=fastest landing aircraft velocity, i.e. 105 knots.

This precaution prevents complementing of the counter before it has gone through its first zero state. It also precludes negative values of $T_0$ in Equation 4 for values of $V_P=V_{PF}$.

Third, the total time between start of counting at $n'$ and arrival at the half count $n/2$ must equal the time for the slowest aircraft to cover the distance $D_1$. Thus, $$(16) \qquad \frac{D_1}{V_{PS}}=\frac{\gamma}{k}+\frac{n}{2m_1}$$

$V_{PS}$=slowest landing aircraft velocity, i.e., 30 knots.

The actual choice of values for $n$ and $m_1$ is actually based upon practical considerations. The exemplary counting rate $m$ is 4000 cycles.

It has been pointed out that the distance $D_1$ is kept as small as possible to minimize aircraft velocity variations in the computer solution. After the retroreflector has passed the fore sheet of light 21, the aircraft travels an additional distance $(D_2-D_3)$ before the cable 25 begins to rise (see Figure 8). However $(D_2-D_3=kD_1$; hence it is desirable to make $k$ as small as possible for the same reason that $D_1$ is kept small. Relationship 15 prevents choice of very small values of $k$, since a value of $\gamma$ equal to about 40 milliseconds occurs in practice. By choosing $k=1$, and $D_1$ approximately 8 feet, Equation 15 is satisfied. Any appreciable reduction in $k$ from the value 1 necessitates an increase in the size of $D_1$ and defeats the purpose of keeping the total distance $(D_1+kD_1)$ as small as possible.

With these values of $m_1$, $\gamma$, and $k$, examination of Equation 16 discloses that $n$ must lie in the neighborhood of 1000. The exact value of $n$ for a binary counter is expressed by the formula:

$$(17) \qquad n=2^N-1$$

where N is the number of binary stages.

$$\text{For } N=10,\ n=1023.$$

Finally, having chosen $m_1$=4000 cycles/second and $n$=1023, it is possible to plot $D_1$ from Equation 16 and $n'$ from Equation 14 as functions of $\gamma/k$. This relation is shown in the graph, Figure 10. The unusable region of this figure is defined by the inequality 15. Thus, considering the plot of $D_1$ vs. $\gamma/k$, if one selects a value of $D_1$ and divides this value by $V_{PF}$=177.5 ft./sec., the resulting value must be greater than the corresponding value of $\gamma/k$. This inequality is satisfied only to the left of the unusable region and from these plots one defines the values of $D_1$ and $n'$ which are required for usable values of $\gamma/k$. After $k$ has been selected, the quantities $D_1$, $(D_2-D_3)$ and $m_2$ are obtained from Equations 16 and 10 and the pertinent constants of Equations 4*a* and 9 are completely defined.

It is thus clear that for a given installation and parameter selection, as hereinabove outlined, the preset computer count $n'$ is readily determinable from the relationships as shown in Figure 10. Also, the distance between the deck units 22, 23 as seen in Figure 10 may in practice be from somewhat over 6 feet to somewhat over 9 feet. Such practical range overcomes the intersection of the beams 20, 21 across a 100 ft. deck, for the 3° azimuth wedge of the exemplary beams.

*Computer system and functioning*

Figure 11 is a block diagram of the invention barrier triggering device schematically showing the relationship of the various components constituting the computer system 35 to effect the outlined operation. The aft deck unit 22 and fore deck unit 23 are located downwind from the "pop-up" barrier cable 25 as the carrier is aligned for the aircraft A landing (see Figure 1). As the retroreflector on the aircraft successively passes the deck units 22 and 23, two pulse trains of 8,000 cycle signal appear at the output of preamplifier 30. The light receiver for beam 88 of deck unit 22 is coupled by leads 95 to an amplifier 96 and cathode follower 97 and by cable 32 to preamplifier 30. Similarly, the light received for beam 88' of deck unit 23 is connected to a corresponding amplifier and cathode follower by output leads 95' and by cable 33 to the input of preamplifier 30.

The two pulse trains of 8,000 cycle signal at preamplifier 30 are thereupon amplified at 31 and peak-limited by unit 98. The output of peak-limiter 98 is impressed upon a circuit 99 resonant at the 8000 cycles. An amplifier 107 follows the sharply tuned circuit 99 and impresses the 8000 cycle signal bursts upon an amplitude selector 108. Amplitude selector 108 is a biased detector.

The peak limiter 98 prevents any single intense light pulse from shock exciting the tuned circuit 99 to simulate a true 8000 cycle signal. When a succession of about eight 8000 cycle peak limited pulses, however, is applied to the tuned circuit 99, the input to the amplitude selector 108 exceeds an activating threshold to individuate the desired 8000 cycle pulses from the spurious signals, and a detected voltage appears in its output. This voltage is first amplified at 109 and then differentiated at 110 to produce two sharp positive pulses corresponding to both times that the retroreflector 42 passes each deck unit 22, 23. The time interval ($T_2-T_1$) between these two pulses is used as a measure of the aircraft velocity V. In the case where two spaced retroreflectors on the vehicle move past a single optical unit (corresponding to 22), two similar signal pulse trains would occur to effect equivalent control action on the computer 35.

Figures 12 to 41 illustrate the output wave forms in the computer system of Figure 11. The encircled numerals at the respective figure bracketing denotes the circuit points in diagram Figure 11 corresponding to the same numerals. The curves in the respective Figures 12 to 41 are for these three modes of operation:

(A) Aircraft velocity greater than the maximum deck landing speed of $V_2$ (105 knots);

(B) Aircraft velocity between the established minimum and maximum deck landing speeds $V_1$ and $V_2$ (30 to 105 knots);

(C) Aircraft velocity less than the established minimum deck landing speed of $V_1$ (30 knots).

The respective aircraft speeds V or range for the three modes A, B and C are indicated in Figures 12 through 41.

Figure 12:
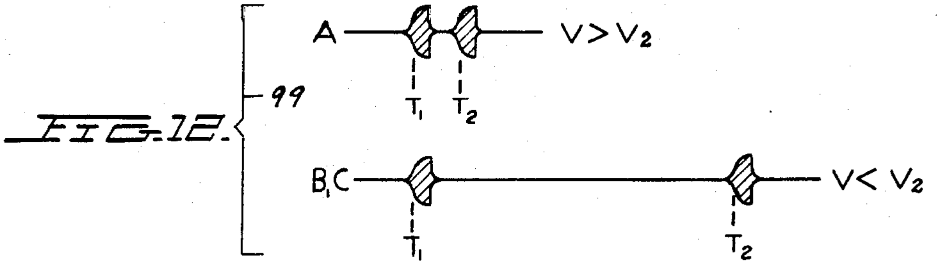
Figures 12 to 41 are signal wave forms at respective points of the photo-electronic system hereof as related to correspondingly indicated points of Figure 11.

The output signal wave forms at point 99 of the computer of Figure 11 are denoted in Figure 12, namely, for the tuned circuit 99. At the respective times $T_1$ and $T_2$, the 8000 cycle signals burst form the modulated waves indicated in mode A, closely spaced, for a velocity greater than the maximum $V_2$. However, in modes B, C, the time interval $T_1$ and $T_2$ is greater due to speed V being less than the maximum $V_2$. The sharply tuned circuit 99 is used to add to the uniqueness of reception and detection of the retroreflected beams transmitted at the 8000 cycle rate.

Figure 13:
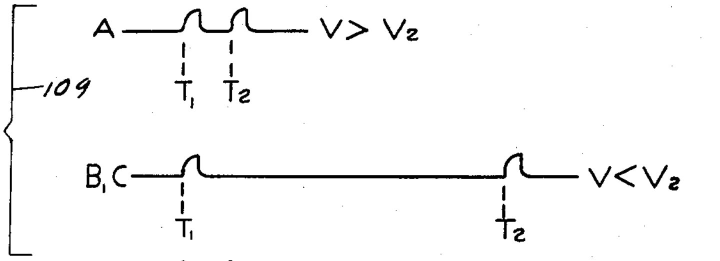
Figure 14:
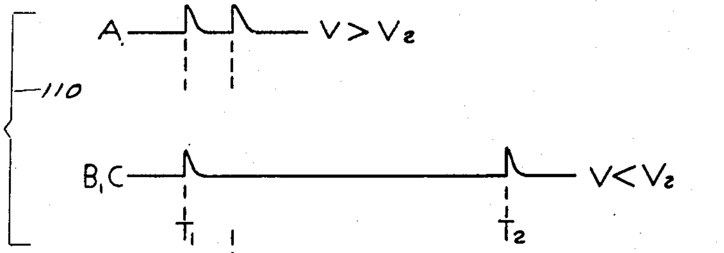
Figure 15:
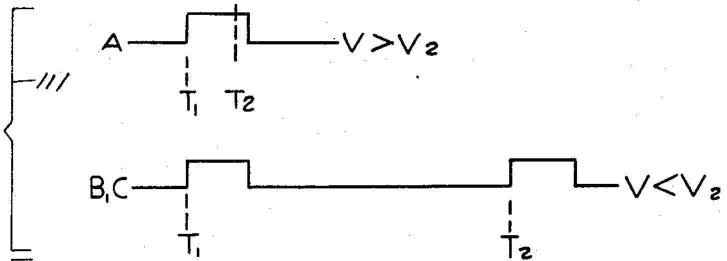
Figure 16:
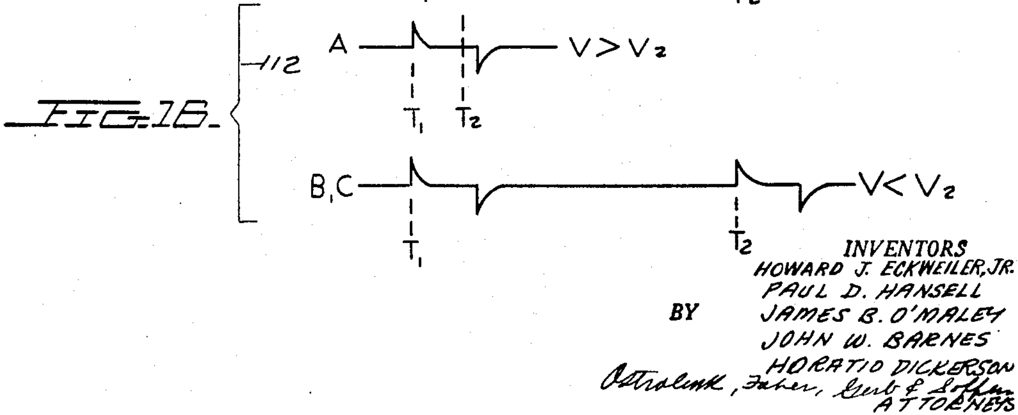
Figure 17:
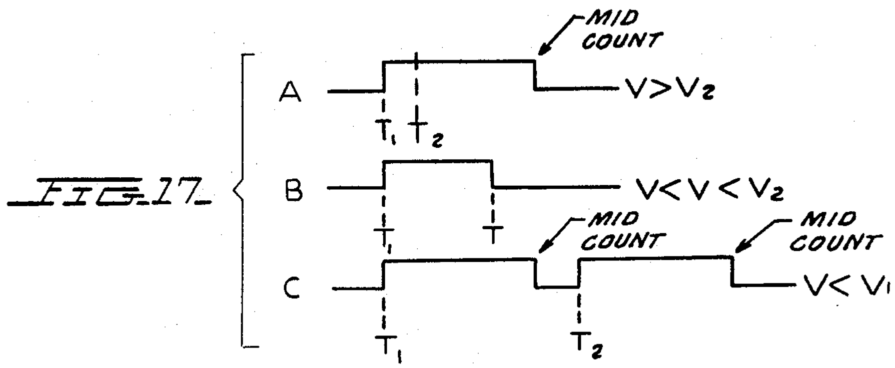
Figures 18, 19:
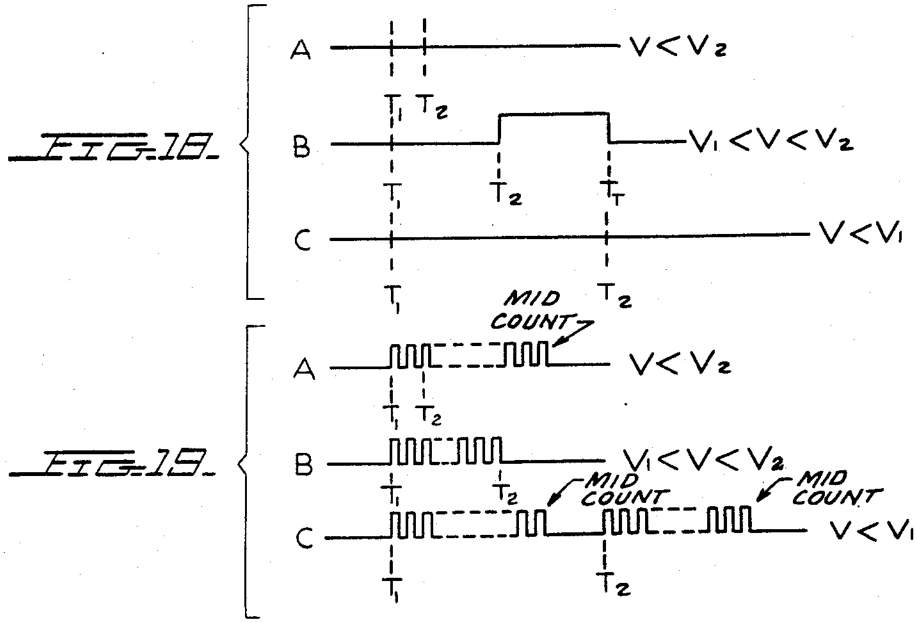
Figure 20:
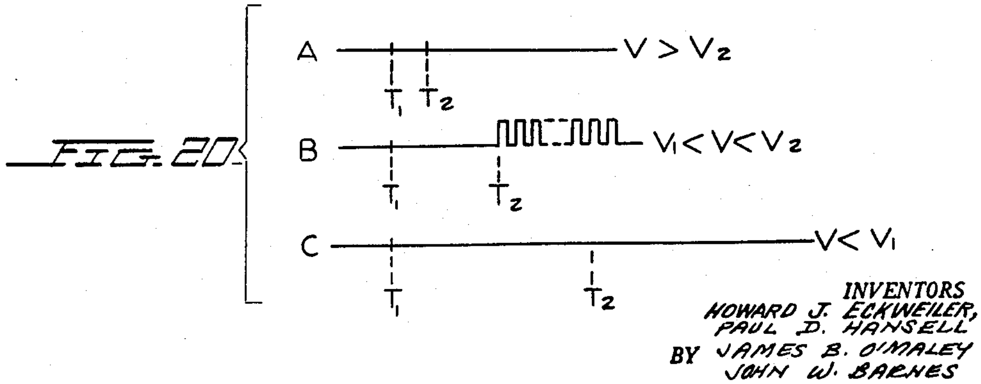
Figure 21:
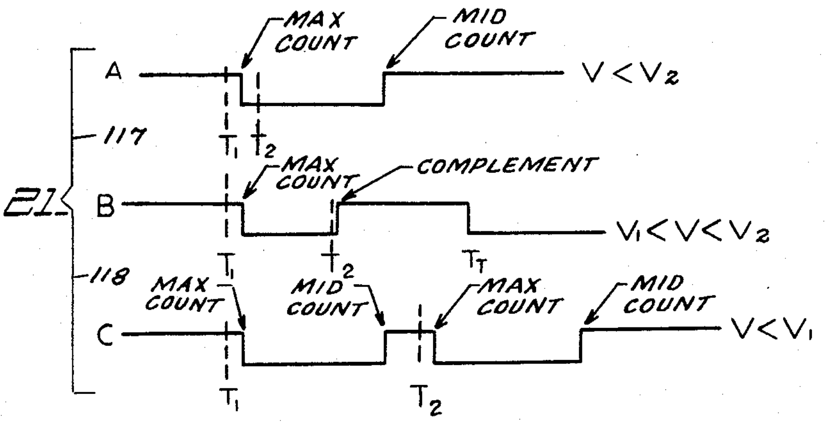
Figure 22:
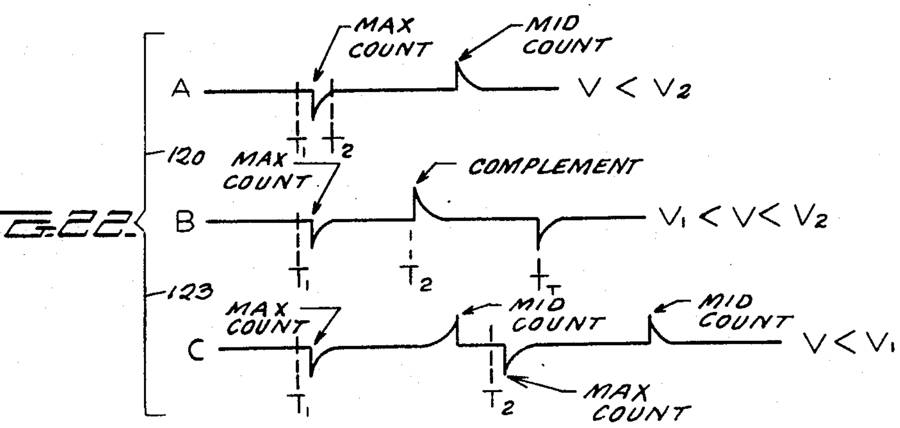
Figure 23:
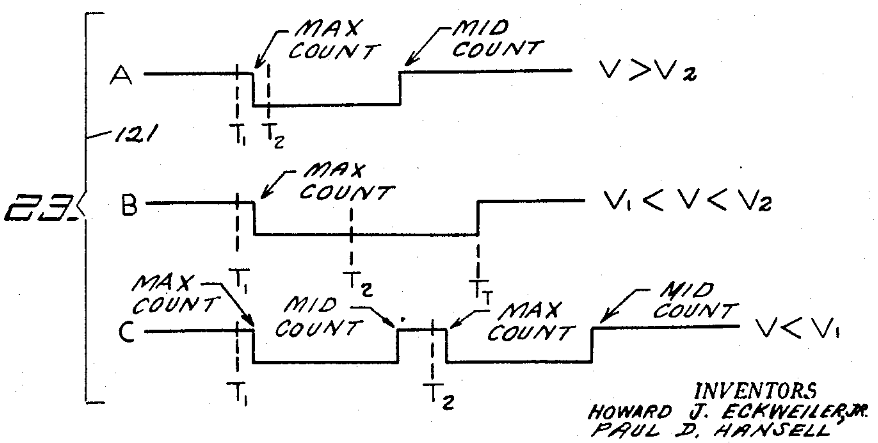
Figure 24:
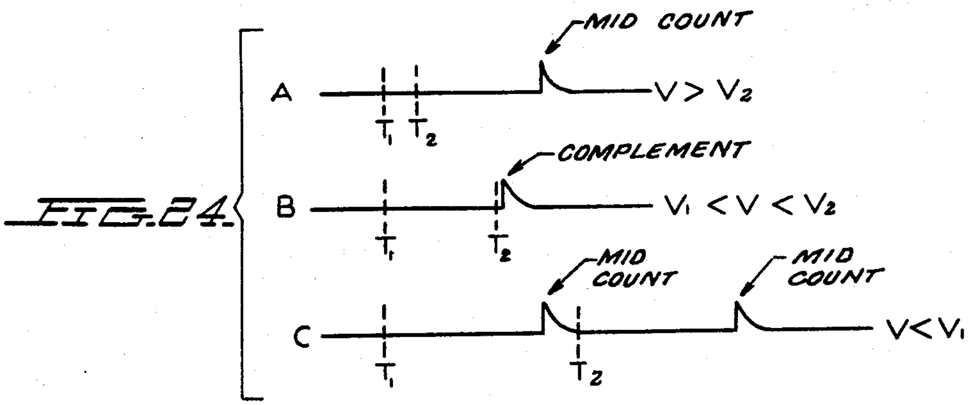
Figure 25:
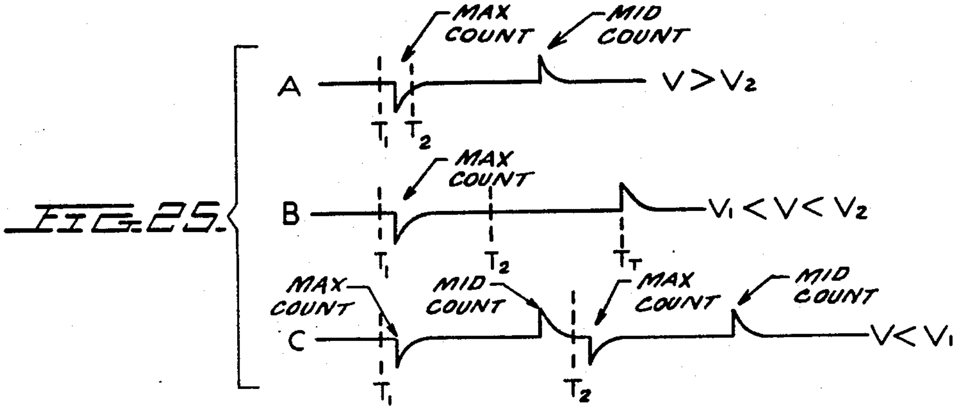
Figure 26:
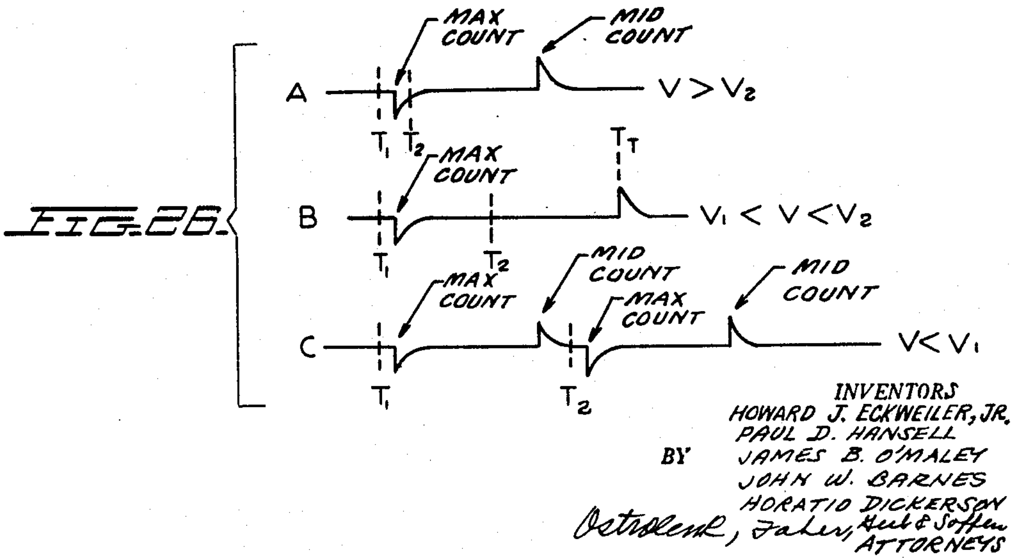

The wave shape of the corresponding signals at amplifier 109, after having passed through the amplitude selected or biased detector 108, is indicated in Figure 13. The fully modulated wave shapes of Figure 12 result in positive pulses on the positive side at the time locations identical to that of Figure 12. Differentiation of the signal from amplifier 109, at unit 110, results in the sharp positive pulses shown in Figure 14 corresponding to the times the retroreflector passes each deck unit 22, 23, as aforesaid.

Operated by the differentiating network 110 is a positive pulse-activated monostable flip-flop unit 111 whose time constant is chosen to have an "on" period corresponding to the time interval required for a 105 knot $V_2$ aircraft to traverse the distance between deck units 22 and 23 ($C_1$, $C_2$). For aircraft velocities greater than $V_2$ (105 knots), the pulse from the second deck unit 23 arrives before the monostable flip-flop 111 returns to its initial state. Hence, the monostable flip-flop 111 has only one "on" period as shown in wave form 111A of Figure 15. For those aircraft travelling less than $V_2$, the pulse from the second deck unit 23 arrives after the monostable flip-flop 111 has returned to its initial state. Hence, the monostable flip-flop 111 has two "on" periods as shown at 111B, C. The output of monostable flip-flop 111 is, in turn, differentiated at unit 112, and the resulting positive pulses as shown at 112B, C (Figure 16) corresponding to the times $T_1$ and $T_2$ are fed to a gated dual counter 117, 118.

The gated dual counter contains two positive pulse-activated bistable flip-flop gate controls 113 and 114, and in-count gate and pulse shaper 115, an out-count gate and pulse shaper 116, and two ten-stage binary counters 117 and 118. Each counter 117, 118 is preceded by a frequency divider stage as indicated (Figure 11). The output of a fork controlled 4000 cycle ($f_0$) frequency unit feeds the input of both the in-count and out-count gates and pulse shapers 115, 116. The positive pulse at time $T_1$ triggers the bistable flip-flop gate control 113 (Figure 17) which in turn opens the in-count gate and pulse shaper 115. This allows 4000 cycle pulses to feed the first stage of both counters 117 and 118 (see Figures 19 and 20). The counters start counting at $T_1$ from a preset number $n'$ greater than one-half the counter capacity (100, Figure 9) predetermined as heretofore set forth.

When the maximum count $n$ (101) is exceeded by one count, the last stage of each counter 117 and 118 changes to the ground state 102. Such change appears as a voltage drop shown at 117A, B, C, and 118A, B, C, Figure 21. This voltage change from each of counters 117 and 118 is differentiated at unit 119 to form a sharp negative pulse. The unit 119 output is fed to an agreement gate 120. Agreement gate 120 requires the coincidence of two like-signed pulses in order to transmit them to its output. The negative pulse shown at 120A, B, C (Figure 22) being passed by agreement gate 120 triggers the negative pulse-activated bistable flip-flop 121. The resulting voltage drop at 121A, B, C (Figure 23) is fed through two circuits and is blocked at subsequent points 127 and 142 to reject the first maximum count. In parallel with differentiator 119 is a differentiator 122 and mixer 123 which feeds a positive pulse transmit circuit 124. The voltage drop in the output of counters 117 and 118 is not passed by the positive pulse transmit circuit 124 (see Figure 24).

After the counters 117 and 118 thus reach their maximum count $n$ (101, Figure 9) they revert to their zero state 102 and continue counting. If the aircraft is travelling at less than $V_1$ speed (30 knots) or more than $V_2$ speed (105 knots), the counters 117, 118 will reach their mid-count $p$, at which time the last stage of each counter 117 and 118 again changes to the excited state, and this change appears as a voltage rise in their outputs. The less than $V_1$ (30 knot) case is shown at 117C and 118C (Figure 21); the more than $V_2$ (105 knot) case is shown at 117A and 118A. The positive pulse from this voltage rise is passed by the mixer 123 and by the positive pulse transmit circuit 124 to the addition circuit 126.

Figure 27:
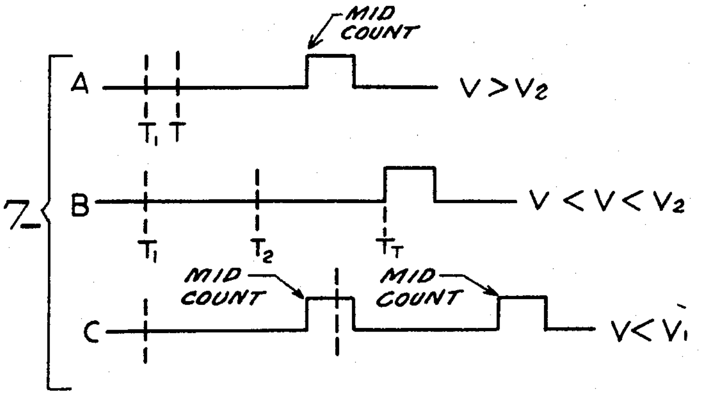

The addition circuit 126 will pass a pulse of either positive or negative polarity (Figure 26), but if pulses of opposite polarity arrive coincident, no pulse appears in its output. The positive pulse, resulting from the counters 117, 118 reaching the mid-count $n/2$ as shown at 124A, C (Figure 24) is passed by the addition circuit 126 and triggers the positive pulse activated monostable flip-flop unit 127 which has an "on" period of approximately 100 milliseconds (Figure 27). The output of the monostable flip-flop unit 127 feeds cathode follower 128. The output of the cathode follower 128 is differentiated at unit 129.

Figure 28:
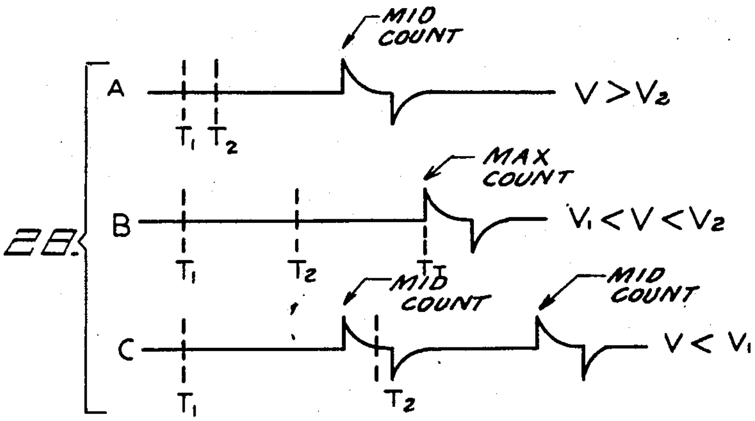
Figure 29:
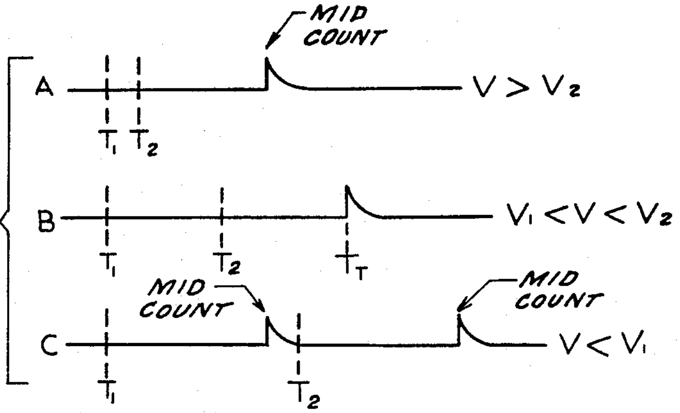
Figure 30:
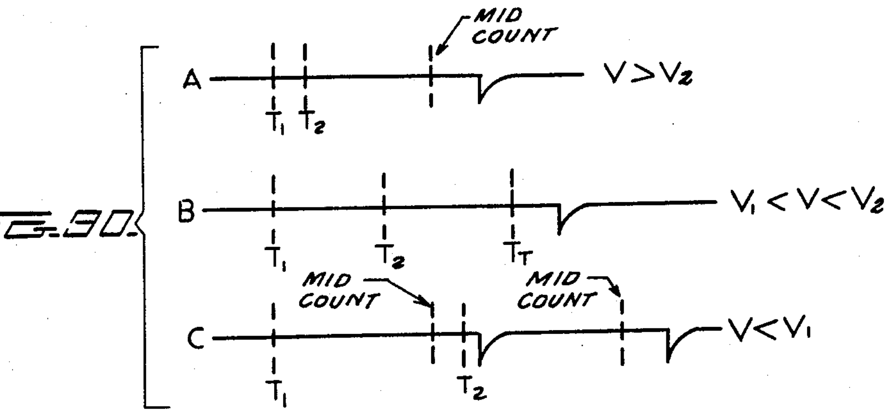

The differentiated output of 129 forms a sharp positive pulse and a sharp negative pulse 100 milliseconds later as shown at 129A, C (Figure 28). The positive pulse alone is passed by a positive pulse transmit circuit 130 (Figure 29) and resets both counters 117 and 118, as well as the bistable flip-flop units 113, 114 to their initial states. The negative pulse, occurring approximately 100 milliseconds later, is passed by the negative pulse transmit circuit 131 (Figure 30) and resets bistable flip-flop 121 to its initial state. For those aircraft travelling less than $V_1$ speed (30 knots), this counter cycle is repeated at time $T_2$. In this fashion, for aircraft relative velocities outside the range of $V_1$ to $V_2$ (30 to 105 knots), the computer restores itself to its initial state and does not trigger the thyratron circuit 26.

For aircraft speeds between $V_1$ and $V_2$ (30 to 105 knots), the positive pulse from differentiator 112 at $T_2$ initiated by the retroreflector passing the second deck unit 23 occurs before the counters 117 and 118 reach their mid-count $n/2$. This positive pulse triggers bistable flip-flop unit 113 back to its initial state, which closes the in-count gate and pulse shaper 115. Also, at time $T_2$, the voltage rise from bistable flip-flop 113 is differentiated at 132. The resulting sharp positive pulse (Figure 31) triggers positive pulse activated bistable flip-flop unit 114. The voltage rise from bistable flip-flop unit 114 (Figure 18) opens the out-count gate and pulse shaper 116, allowing 4000 cycle pulses to feed the divider stage of each counter 117 and 118.

The divider stage at the initial portion of each counter 117, 118 is, in the exemplary embodiment, set at half rate excitation of the counters, operable when signals are impressed directly to the divider stages. In addition, it is necessary at the time $T_2$ to change the counter to its complement state 104 as indicated in Figure 9 and described hereinabove. A problem arises in complementing the counter 117, 118 while normal counting is taking place. If the complementing pulse occurs when a stage of the counter is a changing state, uncertainty results. The circuits 133 through 137 are introduced to prevent such uncertainty.

As shown by wave form 116B (Figure 20) the divider stages of counters 117 and 118 are triggered by the leading edge of the 4000 cycle square waves. It is desirable, therefore, to trigger the complementing circuit at the trailing edge of the first 4000 cycle square wave after time $T_2$, a very small time delay of $\epsilon$. In order to accomplish this, an output which is 180° out of phase from that feeding the divider stages is taken from the out-count gate and pulse shaper 116. This output is differentiated at 133 (Figure 32) and passed through the positive pulse transmit circuit 134 (Figure 33) to trigger the bistable flip-flop unit 135 which may be a one-shot multivibrator.

Figure 31:
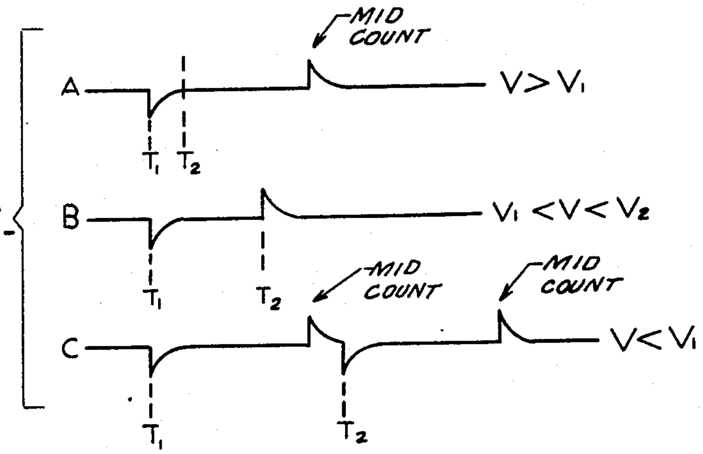
Figure 32:
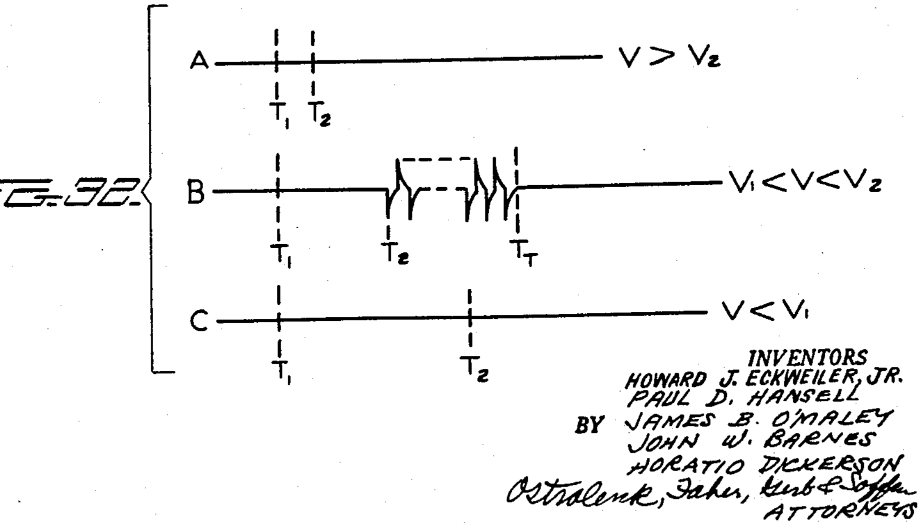
Figure 33:
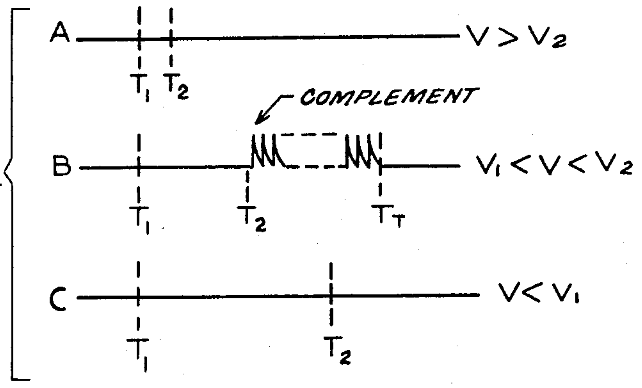
Figure 34:
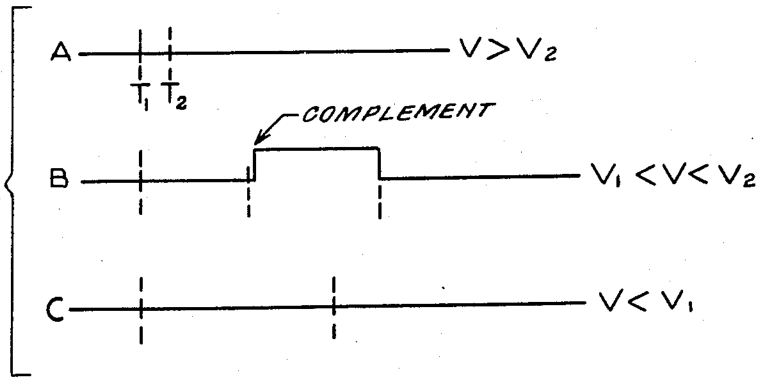
Figure 35:
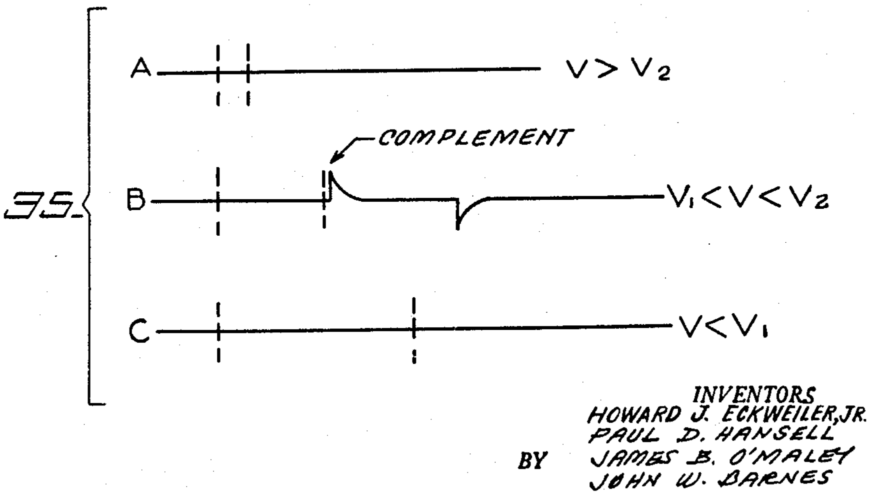
Figure 36:
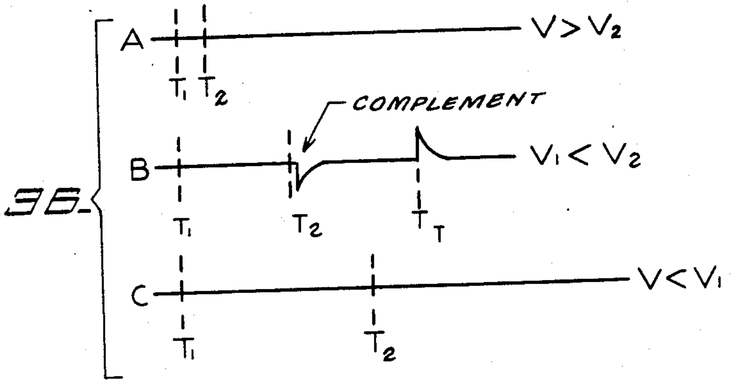

The voltage rise in the output of bistable flip-flop unit 135 and cathode follower 136 (see Figure 34) is differentiated at 137 (Figure 35) and fed to all stages in the counters 117 and 118. This action triggers these stages to their complementary state at the instant $T_2+\epsilon$. A voltage rise occurs in the last stages of each counter 117 and 118 as they change to their excited state as shown at 117B and 118B (Figure 31). This voltage rise has to be distinguished from that which would occur at mid-count $n/2$.

Figure 37:
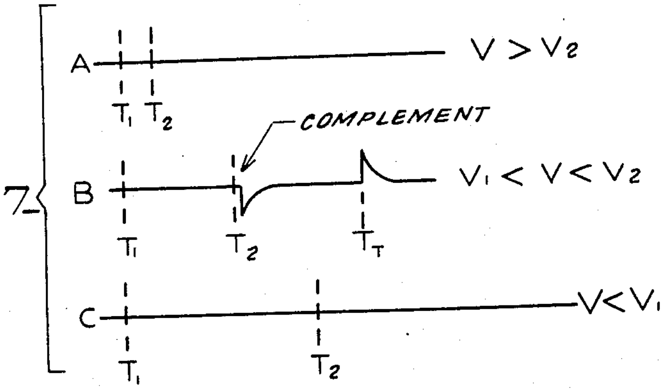
Figure 38:
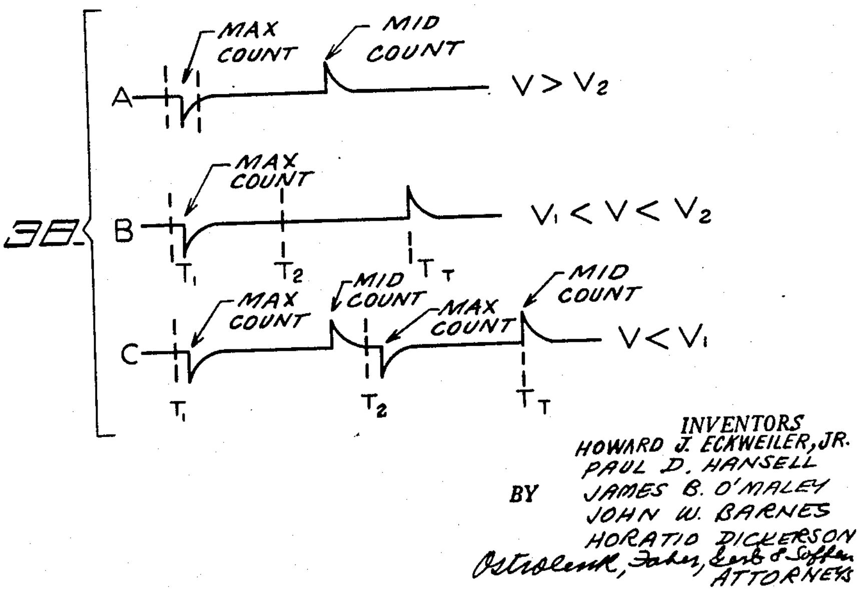
Figure 39:
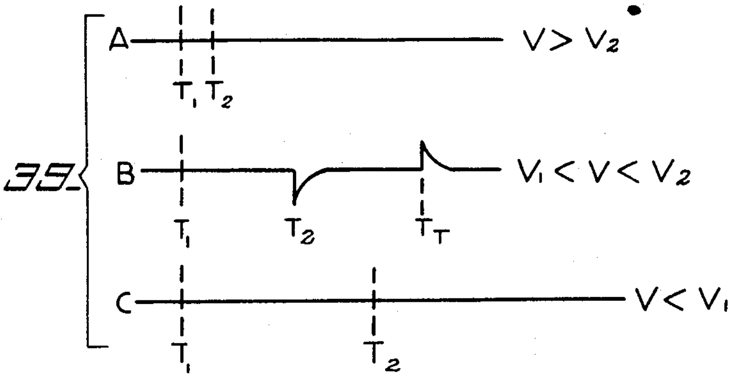

In order to prevent reset of the system at this time, a voltage drop from the bistable flip-flop 135 is differentiated at 128 (see Figure 36) and passed by the negative pulse transmit circuit (139, Figure 37). This pulse negates the positive pulse from the positive pulse transmit circuit 124 at addition circuit 126. After the counters 117 and 118 have been complemented, they continue to count at the same half-rate until they exceed the maximum count $n$ (105, Figure 9) by one count, at which instant $T_T$, the last stage of each counter 117 and 118 has been restored to its ground state 106 as shown at 117B and 118B, Figure 21.

The corresponding voltage drop in counters 117 and 118 is passed by agreement gate 120 and triggers negative pulse activated bistable flip-flop unit 121 back to its initial state. The voltage rise from bistable flip-flop unit 121 is differentiated at 125 and passed by addition circuit 126 to trigger monostable flip-flop unit 127. The result is the resetting of counters 117 and 118 and bistable flip-flops 114 and 135. The same voltage rise from bistable flip-flop unit 121 is differentiated at 140 (see Figure 38) and is fed to agreement gate 142.

Figure 40:
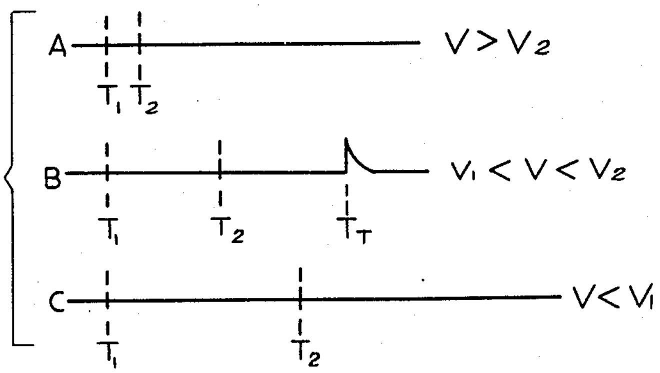
Figure 41:
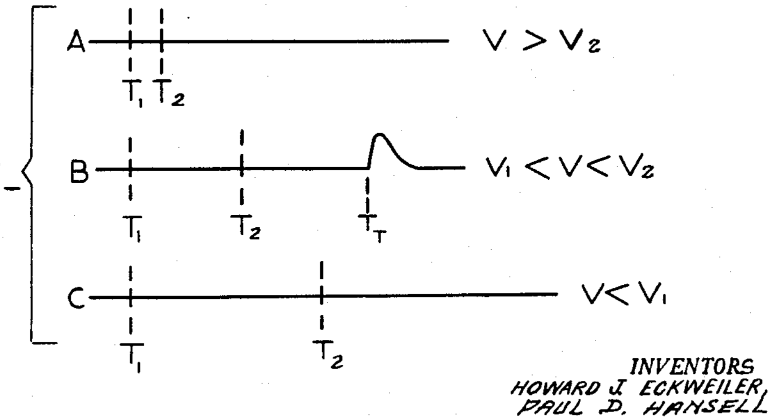

At time $T_T$, when bistable flip-flop 114 is reset, the resultant voltage rise is differentiated at 141 (Figure 39) and simultaneously fed to agreement gate 142 (see Figure 40). This pulse, arriving in coincidence with the pulse from bistable flip-flop unit 121, is passed by the agreement gate 142 to a cathode follower 143 and triggers the thyratron circuit 26 (at Figure 41).

If only one counter were used in the invention system, it would be possible, due to malfunction of the counter, to trigger the barrier cable 25 at an incorrect time. To prevent this, two counters 117, 118 are incorporated, and the timing solution of each must be coincident in order to fire the thyratron circuit 26. This is accomplished by feeding the differentiated outputs of counters 117 and 118 to agreement gate 120. If the pulses from each counter are not coincident and identically signed, a pulse does not appear in the output of agreement gate 120; hence, the negative pulse-activated bistable flip-flop unit 21 is not triggered.

The thyratron circuit 26 is prevented from firing by agreement gate 142, which requires the coincident arrival of pulses from both bistable flip-flop unit 121 and bistable flip-flop unit 114. The counters 117 and 118, however, will continue counting until one of them reaches its mid-count $n/2$ and a voltage rise appears in the output of its last stage. This voltage rise is differentiated at 122 and passed by mixer 123 and positive pulse transmit circuit 124 to reset the computer as was done in the case of aircraft travelling more than $V_2$ speed (105 knots) and less than $V_1$ speed (30 knots).

*General summary*

While the invention has been described and illustrated in connection with its application to the landing of an aircraft on a carrier deck in conjunction with a barrier cable, it is evident that its principles and features are applicable for various other uses and purposes. For example, any moving object or vehicle upon which a retroreflector cluster is mountable may be used instead of the example aircraft landing. Also, in place of triggering the barrier cable, the computer output circuit may be used to actuate any mechanical or other type of physical element, such as snapping a camera for a photograph.

The fundamental aspect of the present invention is to uniquely intercept the passage of a moving body carrying a retroreflector, between two spaced points, and thereby determine its velocity across said points. These spaced points may be on ground for a one retroreflector system with spaced beams or with two spaced retroreflectors and one beam. The essential feature of uniqueness of retroreflected beam detection permits the invention system to be fool-proof as against spurious responses to light or reflections having no bearing to reflected pulses for the computer system.

The invention use of retroreflection of light sheets that are modulated avoids errors due to false targets. Each light sheet contains two 180° oppositely phased pulsed light beams which merge to constitute each light sheet. Thus, a reflection due to large diffuse surfaces such as airplane wings reflects both portions of such beam and produces a continuous light beam reflection with no influence on the receiving computer system. On the other hand, a glint or momentary reflection such as from a window pane does not influence the computer system as it is arranged to be responsive to reflections at a particular frequency and for a minimum duration thereof (e.g. 8 cycles at 8000 cycles per second). The use of a retroreflector cluster 42 provides accurate determination of the passage of such cluster through each light beam and permits accurate timing by the computer control.

Important aspects of the invention, as hereinabove set forth, include the further safety factor of using a novel dual counter arrangement, which counters must be in accurate agreement as to their solution of timing before actuation of the transducer is possible. Further, the novel computer system of the invention incorporates beams whereby computer output control is effective only during velocity determinations (due to the moving cluster) between predetermined minimum and maximum speeds. In other words, should the vehicle or body be detected as moving below a preset minimum speed, or above a preset maximum speed, the computer system of the invention automatically prevents actuation of the transducer which is in the disclosed embodiment barrier cable release solenoid 27.

A predetermined time delay is built into the invention computer to integrate the necessary time lags of displacement, including that of the vehicle passing the second light sheet and the subsequent moment of the required actuation inversely proportional to the speed of the vehicle between the light sheets, as well as a known time lag due to the action of the transducer and other elements of the system. Thus, in the barrier cable triggering system disclosed hereinabove, the computer 35 predetermines the exact time required for the actuation of thyratron circuit 26 after the aircraft intercepts the fore light sheet 21. Such time interval is dependent upon the transverse component of the speed of aircraft A across distance $D_1$. It is the time for the aircraft to reach its position with respect to barrier cable 25 for the release of the cable to clear impediments on the aircraft as the cable rises vertically to engage its catchment point. Further, the time delay of the release solenoid 27 action per se, as well as the time for the barrier cable rise, is integrated in the overall computed timing, as set forth hereinabove.

The invention system provides a fool-proof rugged device which uniquely senses the passage of a particular body between one or two fixed points, determines its speed, and controls the actuation of a transducer after a timing interval proportional to the speed of the body between such points, and contains safety features which prevent false actuation due to possible digital counter error or due to the interception of spurious reflections or false beams from the moving body or otherwise. The invention is applicable to many types of systems and is useful for vehicles or other bodies moving at widely divergent speeds.

Accordingly, although the present invention has been specifically described in connection with a particular embodiment, it is to be understood that variations and modifications of its application, use or arrangement may be made without departing from the broader spirit and scope of the invention, as set forth in the following claims.

We claim:

1. A system responsive to the velocity of a vehicle comprising a retroreflector mounted on the vehicle, optical means developing successive pulses of light in the form of a beam transversely across the path of the vehicle with the retroreflector intercepting the light pulses upon passage of the vehicle through the beam and retroreflecting corresponding light pulses directly back to said optical means, photoelectric means arranged adjacent said optical means for intercepting the retroreflected light pulses and generating electrical signals upon said vehicle passage, and computer control means responsive to said electrical signals for effecting actuation of a device, said computer control means including two counters operated in unison, and an agreement gate connected to the output of said two counters for transmitting an actuation signal only when the two counters are in substantial time coincidence.

2. A safety barrier system for an aircraft carrier deck with a barrier device movable into arresting position for a landing aircraft comprising a retroreflector mounted on the aircraft, optical means developing successive pulses of light in the form of a vertical sheet transversely across the path of the aircraft with the retroreflector intercepting the light pulses upon passage of the aircraft through the sheet and retroreflecting corresponding light pulses directly back to said optical means, photoelectric means arranged adjacent said optical means for intercepting the retroreflected light pulses and generating electrical signals corresponding to the intercepted pulses upon said aircraft passage to provide unique direction of said vehicle passage, and computer control means responsive to said electrical signals for determining the velocity of the aircraft and effecting actuation of the barrier device in accordance with a time interval dependent upon said velocity, said computer control means including two counters operated in unison, and an agrement gate connected to the output of said two counters for transmitting an actuation signal only when the two counters are in substantial time coincidence.

3. A system responsive to the velocity of a vehicle comprising a retroreflector mounted on the vehicle, optical means developing first successive pulses of light emanating from a small region in the form of a beam transversely across the path of the vehicle with the retroreflector intercepting the light pulses upon passage of the vehicle through the beam and retroreflecting corresponding light pulses directly back to said small region, photoelectric means arranged adjacent said small region for intercepting the retroreflected light pulses and generating electrical signals corresponding to the intercepted pulses upon said vehicle passage, means for generating a second series of light pulses phased 180° from the first light pulse series and directed into said beam with said fiirst pulse series whereby ordinary reflection of the composite light beam to said photoelectric means negates the generated signals to provide unique detection of said vehicle passage, and control means responsive to said electrical signals for effecting actuation of a device.

4. A safety barrier system for an aircraft carrier deck with a barrier device movable into arresting position for a landing aircraft comprising a retroreflector mounted on the aircraft, optical means developing first successive pulses of light emanating from a small region in the form of a vertical sheet transversely across the path of the aircraft with the retroreflector intercepting the light pulses upon passage of the aircraft through the sheet and retroreflecting corresponding light pulses directly back to said small region, photoelectric means arranged adjacent said small region for intercepting the retroreflected light pulses and generating electrical signals corresponding to the intercepted pulses upon said aircraft passage, means for generating a second series of light pulses phased 180° from the first light pulse series and directed into said light sheet with said first pulse series whereby ordinary reflection of the composite light sheet to said photoelectric means negates the generated signals to provide unique detection of said aircraft passage, and computer control means responsive to said electrical signals for determining the velocity of the aircraft and effecting actuation of the barrier device in accordance with a time interval dependent upon said velocity.

References Cited in the file of this patent

UNITED STATES PATENTS

| | | |
|---|---|---|
| 1,929,859 | Strauss | Oct. 10, 1933 |
| 2,016,036 | Fitzgerald | Oct. 1, 1935 |
| 2,182,000 | Nichols | Dec. 5, 1939 |
| 2,231,621 | Goodridge | Feb. 11, 1941 |
| 2,448,039 | Lynn | Aug. 31, 1948 |
| 2,712,912 | Hattan | July 12, 1955 |
| 2,783,957 | O'Neil | Mar. 5, 1957 |
| 2,813,230 | Fruengel | Nov. 12, 1957 |
| 2,872,590 | Leavens | Feb. 3, 1959 |